(12) United States Patent
Xu et al.

(10) Patent No.: US 12,439,320 B2
(45) Date of Patent: Oct. 7, 2025

(54) DATA SHARING METHOD, ELECTRONIC DEVICE, AND SYSTEM

(71) Applicant: Huawei Technologies Co., Ltd., Shenzhen (CN)

(72) Inventors: Tianliang Xu, Xi'an (CN); Bingyi Liu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 370 days.

(21) Appl. No.: 18/245,309

(22) PCT Filed: Aug. 4, 2021

(86) PCT No.: PCT/CN2021/110555
§ 371 (c)(1),
(2) Date: Mar. 14, 2023

(87) PCT Pub. No.: WO2022/057485
PCT Pub. Date: Mar. 24, 2022

(65) Prior Publication Data
US 2023/0362782 A1    Nov. 9, 2023

(30) Foreign Application Priority Data
Sep. 15, 2020    (CN) .......................... 202010968138.6

(51) Int. Cl.
*H04W 40/22*    (2009.01)
*H04N 21/41*    (2011.01)
(Continued)

(52) U.S. Cl.
CPC ........ *H04W 40/22* (2013.01); *H04N 21/4122* (2013.01); *H04N 21/43615* (2013.01); *H04W 40/12* (2013.01); *H04W 76/15* (2018.02)

(58) Field of Classification Search
CPC ......... H04N 21/4122; H04N 21/43615; H04N 21/43637; H04W 4/021; H04W 4/023;
(Continued)

(56) References Cited

U.S. PATENT DOCUMENTS

2014/0073244 A1* 3/2014 Ko .......................... H04L 69/14
455/41.1
2015/0131642 A1* 5/2015 Amano .................. H04W 12/50
370/338
(Continued)

FOREIGN PATENT DOCUMENTS

| CN | 105430760 A | 3/2016 |
|---|---|---|
| CN | 107493484 A | 12/2017 |

(Continued)

*Primary Examiner* — Nguyen T Vo
(74) *Attorney, Agent, or Firm* — Slater Matsil, LLP

(57) ABSTRACT

A relay electronic device establishes a first near field wireless connection to a primary electronic device, and receives network connection information of the primary electronic device that is sent by the primary electronic device. The relay electronic device establishes a second near field wireless connection to a secondary electronic device, and receives network connection information of the secondary electronic device that is sent by the secondary electronic device. The relay electronic device determines, based on a first message and a second message, whether a policy for projecting media data of the primary electronic device to the secondary electronic device is directly projecting the media data of the primary electronic device to the secondary electronic device or projecting, by the primary electronic device, the media data of the primary electronic device to the secondary electronic device by using the relay electronic device.

20 Claims, 21 Drawing Sheets

(51) Int. Cl.
*H04N 21/436* (2011.01)
*H04W 40/12* (2009.01)
*H04W 76/15* (2018.01)

(58) Field of Classification Search
CPC ....... H04W 4/80; H04W 40/12; H04W 40/22;
H04W 40/24; H04W 76/14; H04W 76/15;
H04W 88/04; H04W 40/20; H04W 76/10
See application file for complete search history.

(56) References Cited

U.S. PATENT DOCUMENTS

| | | |
|---|---|---|
| 2015/0372746 A1 | 12/2015 | Xie et al. |
| 2017/0142639 A1* | 5/2017 | Meredith .............. H04W 8/005 |
| 2019/0029069 A1* | 1/2019 | Shim .................... H04W 48/08 |
| 2020/0107165 A1* | 4/2020 | Pai ...................... H04W 12/047 |

FOREIGN PATENT DOCUMENTS

| | | |
|---|---|---|
| CN | 110389738 A | 10/2019 |
| CN | 209526823 U | 10/2019 |
| EP | 3388938 A1 | 10/2018 |

* cited by examiner

DATA SHARING METHOD, ELECTRONIC DEVICE, AND SYSTEM

CROSS-REFERENCE TO RELATED APPLICATIONS

This application is a national stage of International Application No. PCT/CN2021/110555, filed on Aug. 4, 2021, which claims priority to Chinese Patent Application No. 202010968138.6, filed on Sep. 15, 2020. Both of the aforementioned applications are hereby incorporated by reference in their entireties.

TECHNICAL FIELD

Embodiments of this application relate to the field of electronic technologies, and in particular, to a data sharing method, an electronic device, and a system.

BACKGROUND

With rapid development of electronic devices and the internet of things (internet of things, IoT) field, collaborative integration of a plurality of electronic devices has become a consensus in the industry. To implement collaboration between a plurality of electronic devices, user data needs to be able to flow between the plurality of electronic devices.

A multi-electronic device scenario, for example, a home scenario, includes an electronic device with high mobility (for example, a mobile phone) and an electronic device with low mobility (for example, Vision or a smart speaker). Sound projection and/or screen projection between the electronic device with low mobility and the electronic device with high mobility may be implemented by using a near field network and/or an application (application, APP) (for example, a Vision app). However, currently, sound projection and/or screen projection between electronic devices with low mobility cannot be implemented, resulting in poor user experience.

SUMMARY

This application provides a data sharing method, an electronic device, and a system, to project data being played on an electronic device with low mobility to another electronic device with low mobility. This implements collaboration between a plurality of electronic devices with low mobility, and improves user experience.

According to a first aspect, a data sharing method is provided. The method includes: A relay electronic device establishes a first near field wireless connection to a primary electronic device. The relay electronic device receives a first message sent by the primary electronic device, where the first message includes network connection information of the primary electronic device. The relay electronic device establishes a second near field wireless connection to a secondary electronic device. The relay electronic device receives a second message sent by the secondary electronic device, where the second message includes network connection information of the secondary electronic device. The relay electronic device determines, based on the first message and the second message, a policy for projecting media data of the primary electronic device to the secondary electronic device, where the policy includes a first policy and a second policy, the first policy is that the primary electronic device directly projects the media data of the primary electronic device to the secondary electronic device, and the second policy is that the primary electronic device projects the media data of the primary electronic device to the secondary electronic device by using the relay electronic device. The relay electronic device projects the media data of the primary electronic device to the secondary electronic device according to the policy for projecting the media data of the primary electronic device to the secondary electronic device.

The primary electronic device and the secondary electronic device may be understood as electronic devices with low mobility. For example, the primary electronic device or the secondary electronic device may be Vision, a smart speaker, a smartwatch, a visual doorbell, or a personal computer PC.

The relay electronic device may be understood as an electronic device with high mobility. For example, the relay electronic device may be a mobile phone.

For example, the near field wireless connection includes a BT connection, a Wi-Fi connection, or a ZigBee (ZigBee) connection.

In some embodiments, the network connection information may be wireless fidelity Wi-Fi network connection information. For example, the Wi-Fi network connection information includes a MAC address and/or an IP address of the primary electronic device. In some other embodiments, the network connection information may be BT pairing information. For example, the BT pairing information includes a BT identifier and a pairing key corresponding to the BT identifier.

The media data of the primary electronic device may be understood as media data being played on the primary electronic device.

In this embodiment of this application, the relay electronic device determines, based on the network connection information of the primary electronic device and the network connection information of the secondary electronic device, the policy for projecting the media data of the primary electronic device to the secondary electronic device, so as to project, to the secondary electronic device according to the determined policy, the media data being played on the primary electronic device. This implements collaboration between a plurality of electronic devices with low mobility, and improves user experience.

With reference to the first aspect, in some implementations of the first aspect, that the relay electronic device determines, based on the first message and the second message, a policy for projecting media data of the primary electronic device to the secondary electronic device includes: The relay electronic device determines, based on the first message and the second message, whether network connection modes of the primary electronic device and the secondary electronic device are the same. When the network connection modes of the primary electronic device and the secondary electronic device are different, the relay electronic device determines that the policy for projecting the media data of the primary electronic device to the secondary electronic device is the second policy. When the network connection modes of the primary electronic device and the secondary electronic device are the same, the relay electronic device determines that the policy for projecting the media data of the primary electronic device to the secondary electronic device is the first policy.

In an implementation, when both the network connection information indicated in the first message and the network connection information indicated in the second message are Wi-Fi network connection information or BT pairing information, the network connection modes of the primary electronic device and the secondary electronic device are the same. When the network connection information indicated in the first message is Wi-Fi network connection information and the network connection information indicated in the second message is BT pairing information, or when the network connection information indicated in the first message is BT pairing information and the network connection information indicated in the second message is Wi-Fi network connection information, the network connection modes of the primary electronic device and the secondary electronic device are different.

When the network connection modes of the primary electronic device and the secondary electronic device are different, the primary electronic device projects, to the secondary electronic device by using the relay electronic device, the data being played on the primary electronic device. When the network connection modes of the primary electronic device and the secondary electronic device are the same, the primary electronic device directly projects, to the secondary electronic device, the data being played on the primary electronic device. Therefore, the media data being played on the primary electronic device can be conveniently and quickly projected to the secondary electronic device based on a type of a network connection technology that can be provided by the primary electronic device and the secondary electronic device. This implements collaboration between a plurality of electronic devices with low mobility, and improves user experience.

With reference to the first aspect, in some implementations of the first aspect, that the relay electronic device determines, based on the first message and the second message, a policy for projecting media data of the primary electronic device to the secondary electronic device includes: The relay electronic device determines, based on the first message and the second message, whether network connection modes of the primary electronic device and the secondary electronic device are the same. When the network connection modes of the primary electronic device and the secondary electronic device are different, the relay electronic device determines that the policy for projecting the media data of the primary electronic device to the secondary electronic device is the second policy. When the network connection modes of the primary electronic device and the secondary electronic device are the same, the relay electronic device determines whether a distance between the primary electronic device and the secondary electronic device meets a preset condition, where the preset condition is that the distance between the primary electronic device and the secondary electronic device is less than or equal to a preset distance. When the distance between the primary electronic device and the secondary electronic device does not meet the preset condition, the relay electronic device determines that the policy for projecting the media data of the primary electronic device to the secondary electronic device is the second policy. Alternatively, when the distance between the primary electronic device and the secondary electronic device meets the preset condition, the relay electronic device determines that the policy for projecting the media data of the primary electronic device to the secondary electronic device is the first policy.

In this embodiment of this application, when the network connection modes of the primary electronic device and the secondary electronic device are different, or when the network connection modes of the primary electronic device and the secondary electronic device are the same and the distance between the primary electronic device and the secondary electronic device does not meet the preset condition, the primary electronic device projects, to the secondary electronic device by using the relay electronic device, the data being played on the primary electronic device. When the network connection modes of the primary electronic device and the secondary electronic device are the same and the distance between the primary electronic device and the secondary electronic device meets the preset condition, the primary electronic device directly projects, to the secondary electronic device, the data being played on the primary electronic device. Therefore, the media data being played on the primary electronic device can be conveniently and quickly projected to the secondary electronic device based on a type of a network connection technology that can be provided by the primary electronic device and the secondary electronic device and the distance between the primary electronic device and the secondary electronic device. This implements collaboration between a plurality of electronic devices with low mobility, and improves user experience.

With reference to the first aspect, in some implementations of the first aspect, before the relay electronic device determines whether the distance between the primary electronic device and the secondary electronic device meets the preset condition, the method further includes: The relay electronic device receives prompt information sent by the secondary electronic device, where the prompt information is used to indicate whether the distance between the primary electronic device and the secondary electronic device meets the preset condition.

With reference to the first aspect, in some implementations of the first aspect, when the policy for projecting the media data of the primary electronic device to the secondary electronic device is the second policy, that the relay electronic device projects the media data of the primary electronic device to the secondary electronic device according to the policy for projecting the media data of the primary electronic device to the secondary electronic device includes: The relay electronic device establishes a third near field network connection to the primary electronic device. The relay electronic device receives, through the established third near field network connection, the media data of the primary electronic device that is sent by the primary electronic device. The relay electronic device establishes a fourth near field network connection to the secondary electronic device. The relay electronic device sends the media data of the primary electronic device to the secondary electronic device through the established fourth near field network connection.

The relay electronic device forwards the data being played on the primary electronic device to the secondary electronic device, so that the data being played on the primary electronic device can be projected to the secondary electronic device, and the media data being played on the primary electronic device can be conveniently and quickly projected to the secondary electronic device. This implements collaboration between a plurality of electronic devices with low mobility, and improves user experience.

With reference to the first aspect, in some implementations of the first aspect, when the policy for projecting the media data of the primary electronic device to the secondary electronic device is the first policy, that the relay electronic device projects the media data of the primary electronic device to the secondary electronic device according to the policy for projecting the media data of the primary electronic device to the secondary electronic device includes: The relay electronic device sends a third message to the primary electronic device, where the third message includes the network connection information of the secondary electronic device, and the third message is used by the primary electronic device to establish a network connection to the secondary electronic device, so that the primary electronic device transmits the media data of the primary electronic device to the secondary electronic device through the network. Alternatively, the relay electronic device sends a fourth message to the secondary electronic device, where the fourth message includes the network connection information of the primary electronic device, and the fourth message is used by the secondary electronic device to establish a network connection to the primary electronic device, so that the secondary electronic device receives, through the network, the media data of the primary electronic device that is transmitted by the primary electronic device.

That the relay electronic device receives the data of the primary electronic device that is sent by the primary electronic device may be understood as that the relay electronic device receives a data stream that is being played on the primary electronic device and that is obtained by encoding the data being played on the primary electronic device. Specifically, the primary electronic device encodes an identifier of the data being played on the primary electronic device, the data being played on the primary electronic device, and an address corresponding to the data being played on the primary electronic device, to obtain the data stream being played on the primary electronic device.

A network connection is directly established between the primary electronic device and the secondary electronic device by using the relay electronic device, and the data being played on the primary electronic device is projected to the secondary electronic device through the network established between the primary electronic device and the secondary electronic device, so that the media data being played on the primary electronic device can be conveniently and quickly projected to the secondary electronic device. This implements collaboration between a plurality of electronic devices with low mobility, and improves user experience.

With reference to the first aspect, in some implementations of the first aspect, the data includes at least one of the following: video data, audio data, document data, or picture data.

According to a second aspect, a data sharing method is provided. The method includes: A secondary electronic device establishes a second near field wireless connection to a relay electronic device. The secondary electronic device sends a second message to the relay electronic device, where the second message includes network connection information of the secondary electronic device. The secondary electronic device projects media data of a primary electronic device according to a policy for projecting the media data of the primary electronic device to the secondary electronic device, where the policy for projecting the media data of the primary electronic device to the secondary electronic device is determined based on the second message, the policy includes a first policy and a second policy, the first policy is that the primary electronic device directly projects the media data of the primary electronic device to the secondary electronic device, and the second policy is that the primary electronic device projects the media data of the primary electronic device to the secondary electronic device by using the relay electronic device.

With reference to the second aspect, in some implementations of the second aspect, when network connection modes of the primary electronic device and the secondary electronic device are different, the policy for projecting the media data of the primary electronic device to the secondary electronic device is the second policy; or when network connection modes of the primary electronic device and the secondary electronic device are the same, the policy for projecting the media data of the primary electronic device to the secondary electronic device is the first policy.

With reference to the second aspect, in some implementations of the second aspect, when network connection modes of the primary electronic device and the secondary electronic device are different, the policy for projecting the media data of the primary electronic device to the secondary electronic device is the second policy; when network connection modes of the primary electronic device and the secondary electronic device are the same and a distance between the primary electronic device and the secondary electronic device does not meet a preset condition, the policy for projecting the media data of the primary electronic device to the secondary electronic device is the second policy; or when network connection modes of the primary electronic device and the secondary electronic device are the same and a distance between the primary electronic device and the secondary electronic device meets a preset condition, the policy for projecting the media data of the primary electronic device to the secondary electronic device is the first policy.

With reference to the second aspect, in some implementations of the second aspect, the method further includes: The secondary electronic device establishes a network connection to the primary electronic device. The secondary electronic device receives test information sent by the primary electronic device. The secondary electronic device determines, based on the test information, whether the distance between the primary electronic device and the secondary electronic device meets the preset condition. The secondary electronic device sends prompt information to the relay electronic device, where the prompt information is used to indicate whether the distance between the primary electronic device and the secondary electronic device meets the preset condition.

In an implementation, the secondary electronic device may determine, based on signal strength of the test information and/or signal quality of the test information, whether the distance between the primary electronic device and the secondary electronic device meets the preset condition.

The signal strength and the signal quality (an LTE system is used as an example below for description) may include one or more of the following parameters: a reference signal received power RSRP, a received signal strength indicator RSSI, reference signal received quality RSRQ, and a signal to interference plus noise ratio SINR.

After the primary electronic device establishes the network connection to the secondary electronic device, the secondary electronic device may determine, based on the test information sent by the primary electronic device, whether the distance between the secondary electronic device and the primary electronic device meets the preset condition, so as to determine, based on the distance between the primary electronic device and the secondary electronic device, the policy for projecting the media data being played on the primary electronic device to the secondary electronic device.

With reference to the second aspect, in some implementations of the second aspect, when the policy for projecting the media data of the primary electronic device to the secondary electronic device is the second policy, that the secondary electronic device projects media data of a primary electronic device according to a policy for projecting the media data of the primary electronic device to the secondary electronic device includes: The secondary electronic device establishes a fourth near field network connection to the relay electronic device. The secondary electronic device receives, through the established fourth near field network connection, the media data of the primary electronic device that is sent by the relay electronic device. The secondary electronic device projects the media data of the primary electronic device.

With reference to the second aspect, in some implementations of the second aspect, when the policy for projecting the media data of the primary electronic device to the secondary electronic device is the first policy, that the secondary electronic device projects media data of a primary electronic device according to a policy for projecting the media data of the primary electronic device to the secondary electronic device includes: The secondary electronic device establishes a network connection to the primary electronic device. The secondary electronic device sends a fifth message to the primary electronic device through the network connection, where the fifth message is used to request the media data of the primary electronic device. The secondary electronic device receives, through the network connection, a sixth message sent by the primary electronic device, where the sixth message includes the media data of the primary electronic device. The secondary electronic device projects the media data of the primary electronic device based on the sixth message.

With reference to the second aspect, in some implementations of the second aspect, the data includes at least one of the following: video data, audio data, document data, or picture data.

According to a third aspect, a data sharing method is provided. The method includes: A primary electronic device establishes a first near field wireless connection to a relay electronic device. The primary electronic device sends a first message to the relay electronic device, where the first message includes network connection information of the primary electronic device. The primary electronic device projects media data of the primary electronic device to a secondary electronic device according to a policy for projecting the media data of the primary electronic device to the secondary electronic device, where the policy for projecting the media data of the primary electronic device to the secondary electronic device is determined based on the first message, the policy includes a first policy and a second policy, the first policy is that the primary electronic device directly projects the media data of the primary electronic device to the secondary electronic device, and the second policy is that the primary electronic device projects the media data of the primary electronic device to the secondary electronic device by using the relay electronic device.

With reference to the third aspect, in some implementations of the third aspect, when network connection modes of the primary electronic device and the secondary electronic device are different, the policy for projecting the media data of the primary electronic device to the secondary electronic device is the second policy; or when network connection modes of the primary electronic device and the secondary electronic device are the same, the policy for projecting the media data of the primary electronic device to the secondary electronic device is the first policy.

With reference to the third aspect, in some implementations of the third aspect, when network connection modes of the primary electronic device and the secondary electronic device are different, the policy for projecting the media data of the primary electronic device to the secondary electronic device is the second policy; when network connection modes of the primary electronic device and the secondary electronic device are the same and a distance between the primary electronic device and the secondary electronic device does not meet a preset condition, the policy for projecting the media data of the primary electronic device to the secondary electronic device is the second policy; or when network connection modes of the primary electronic device and the secondary electronic device are the same and a distance between the primary electronic device and the secondary electronic device meets a preset condition, the policy for projecting the media data of the primary electronic device to the secondary electronic device is the first policy.

With reference to the third aspect, in some implementations of the third aspect, before the relay electronic device determines whether the distance between the primary electronic device and the secondary electronic device meets the preset condition, the primary electronic device establishes a network connection to the secondary electronic device, and the primary electronic device sends test information to the secondary electronic device through the network, where the test information is used by the secondary electronic device to determine whether the distance between the primary electronic device and the secondary electronic device meets the preset condition.

With reference to the third aspect, in some implementations of the third aspect, when the policy for projecting the media data of the primary electronic device to the secondary electronic device is the second policy, that the primary electronic device projects media data of the primary electronic device to a secondary electronic device according to a policy for projecting the media data of the primary electronic device to the secondary electronic device includes: The primary electronic device establishes a third near field network connection to the relay electronic device, and the primary electronic device sends the media data of the primary electronic device to the relay electronic device through the established third near field network connection.

With reference to the third aspect, in some implementations of the third aspect, when the policy for projecting the media data of the primary electronic device to the secondary electronic device is the first policy, that the primary electronic device projects media data of the primary electronic device to a secondary electronic device according to a policy for projecting the media data of the primary electronic device to the secondary electronic device includes: The primary electronic device establishes a network connection to the secondary electronic device. The primary electronic device receives a fifth message sent by the secondary electronic device, where the fifth message is used to request the media data of the primary electronic device. The primary electronic device sends a sixth message to the secondary electronic device through the network connection, where the sixth message includes the media data of the primary electronic device.

With reference to the third aspect, in some implementations of the third aspect, the data includes at least one of the following: video data, audio data, document data, or picture data.

According to a fourth aspect, a data sharing method is provided. The method is applied to a relay electronic device, and the method includes: The relay electronic device establishes a near field wireless connection to a primary electronic device. The relay electronic device receives a first media file sent by the primary electronic device. A first window is displayed on a display interface of the relay electronic device, where the first window includes an identifier of the first media file. The relay electronic device stores the first media file on the relay electronic device after the relay electronic device detects an operation of selecting the first media file by a user in the first window. The relay electronic device establishes a near field wireless connection to a secondary electronic device. A second window is displayed on the display interface of the relay electronic device, where the second window includes the identifier of the first media file. The relay electronic device sends the first media file to the secondary electronic device after the relay electronic device detects an operation of selecting the first media file by the user in the second window.

The identifier of the first media file may include a type identifier of the first media file and/or an identifier of the first media file.

For example, the type identifier of the first media file may be a video file, an audio file, a document file, or a picture file. The identifier of the first media file may be a name of the media file.

In an implementation, in addition to receiving the first media file sent by the primary electronic device, the relay electronic device may further receive another media file sent by the primary electronic device. The first window may further include an identifier of the another media file.

In this embodiment of this application, first, the relay electronic device establishes the near field wireless connection to the primary electronic device. After the relay electronic device establishes the near field wireless connection to the primary electronic device, the primary electronic device sends the first media file on the primary electronic device to the relay electronic device, and the relay electronic device displays the identifier of the first media file on the display interface of the relay electronic device, and stores, on the relay electronic device, the first media file selected by the user. Then the relay electronic device establishes the near field wireless connection to the secondary electronic device. After the relay electronic device establishes the near field wireless connection to the secondary electronic device, the first media file of the primary electronic device is displayed on the display interface of the relay electronic device, and the relay electronic device shares, to the secondary electronic device, the first media file selected by the user. Therefore, the media file of the primary electronic device can be conveniently and quickly shared to the secondary electronic device. This implements collaboration between a plurality of electronic devices with low mobility, and improves user experience.

With reference to the fourth aspect, in some implementations of the fourth aspect, the first window further includes a copy control configured to perform local storage, and that the relay electronic device stores the first media file on the relay electronic device after the relay electronic device detects an operation of selecting the first media file by a user in the first window includes: The relay electronic device stores the first media file on the relay electronic device after the relay electronic device detects an operation of tapping the first media file by the user in the first window and an operation of tapping the copy control by the user in the first window.

The relay electronic device stores, on the relay electronic device based on the media file tapped by the user and the tapping on the copy control, the media file tapped by the user, so that the media file on the primary electronic device can be shared to the relay electronic device according to a requirement of the user. This improves user experience.

With reference to the fourth aspect, in some implementations of the fourth aspect, the second window further includes a paste control configured to perform sending to another electronic device, and that the relay electronic device sends the first media file to the secondary electronic device after the relay electronic device detects an operation of selecting the first media file by the user in the second window includes: The relay electronic device sends the first media file to the secondary electronic device after the relay electronic device detects an operation of tapping the first media file by the user in the second window and an operation of tapping the paste control by the user in the second window.

The relay electronic device sends, to the secondary electronic device based on the first media file tapped by the user and the tapping on the paste control, the first media file tapped by the user, so that the media file of the primary electronic device can be conveniently and quickly shared to the secondary electronic device according to a requirement of the user. This implements collaboration between a plurality of electronic devices with low mobility, and improves user experience.

With reference to the fourth aspect, in some implementations of the fourth aspect, the first window further includes a name of the primary electronic device.

With reference to the fourth aspect, in some implementations of the fourth aspect, the second window further includes the name of the primary electronic device.

With reference to the fourth aspect, in some implementations of the fourth aspect, the first media file includes at least one of the following: a video file, a document file, an audio file, or a picture file.

According to a fifth aspect, a system is provided. The system includes: a relay electronic device, configured to establish a first near field wireless connection to a primary electronic device; the primary electronic device, configured to send a first message to the relay electronic device, where the first message includes network connection information of the primary electronic device, and the relay electronic device is further configured to establish a second near field wireless connection to a secondary electronic device; and the secondary electronic device, configured to send a second message to the relay electronic device, where the second message includes network connection information of the secondary electronic device. The relay electronic device is further configured to determine, based on the first message and the second message, a policy for projecting media data of the primary electronic device to the secondary electronic device, where the policy includes a first policy and a second policy, the first policy is that the primary electronic device directly projects the media data of the primary electronic device to the secondary electronic device, and the second policy is that the primary electronic device projects the media data of the primary electronic device to the secondary electronic device by using the relay electronic device. The relay electronic device is further configured to project the media data of the primary electronic device to the secondary electronic device according to the policy for projecting the media data of the primary electronic device to the secondary electronic device.

With reference to the fifth aspect, in some implementations of the fifth aspect, the relay electronic device is further specifically configured to determine, based on the first message and the second message, whether network connection modes of the primary electronic device and the secondary electronic device are the same. When the network connection modes of the primary electronic device and the secondary electronic device are different, the relay electronic device is further specifically configured to determine that the policy for projecting the media data of the primary electronic device to the secondary electronic device is the second policy. When the network connection modes of the primary electronic device and the secondary electronic device are the same, the relay electronic device is further specifically configured to determine that the policy for projecting the media data of the primary electronic device to the secondary electronic device is the first policy.

With reference to the fifth aspect, in some implementations of the fifth aspect, the relay electronic device is further specifically configured to determine, based on the first response message and the second response message, whether network connection modes of the primary electronic device and the secondary electronic device are the same. When the network connection modes of the primary electronic device and the secondary electronic device are different, the relay electronic device is further specifically configured to determine that the policy for projecting the media data of the primary electronic device to the secondary electronic device is the second policy. When the network connection modes of the primary electronic device and the secondary electronic device are the same, the relay electronic device is further specifically configured to determine whether a distance between the primary electronic device and the secondary electronic device meets a preset condition, where the preset condition is that the distance between the primary electronic device and the secondary electronic device is less than or equal to a preset distance. When the distance between the primary electronic device and the secondary electronic device does not meet the preset condition, the relay electronic device is further specifically configured to determine that the policy for projecting the media data of the primary electronic device to the secondary electronic device is the second policy. Alternatively, when the distance between the primary electronic device and the secondary electronic device meets the preset condition, the relay electronic device is further specifically configured to determine that the policy for projecting the media data of the primary electronic device to the secondary electronic device is the first policy.

With reference to the fifth aspect, in some implementations of the fifth aspect, before the relay electronic device is further specifically configured to determine whether the distance between the primary electronic device and the secondary electronic device meets the preset condition, the primary electronic device is further configured to establish a network connection to the secondary electronic device; the primary electronic device is further configured to send test information to the secondary electronic device through the network; the secondary electronic device is further configured to determine, based on the test information, whether the distance between the primary electronic device and the secondary electronic device meets the preset condition; and the relay electronic device is further configured to receive prompt information sent by the secondary electronic device, where the prompt information is used to indicate whether the distance between the primary electronic device and the secondary electronic device meets the preset condition.

After the primary electronic device establishes the network connection to the secondary electronic device, the secondary electronic device may determine, based on the test information sent by the primary electronic device, whether the distance between the secondary electronic device and the primary electronic device meets the preset condition, and send, to the relay electronic device, the prompt information used to indicate whether the distance between the primary electronic device and the secondary electronic device meets the preset condition, so that the relay electronic device determines, based on the distance between the primary electronic device and the secondary electronic device, the policy for projecting the media data being played on the primary electronic device to the secondary electronic device.

With reference to the fifth aspect, in some implementations of the fifth aspect, when the policy for projecting the media data of the primary electronic device to the secondary electronic device is the second policy, that the relay electronic device is further configured to determine, based on the first message and the second message, a policy for projecting media data of the primary electronic device to the secondary electronic device includes: The relay electronic device is further specifically configured to establish a third near field network connection to the primary electronic device. The relay electronic device is further specifically configured to receive, through the established third near field network connection, the media data of the primary electronic device that is sent by the primary electronic device. The relay electronic device is further specifically configured to establish a fourth near field network connection to the secondary electronic device. The relay electronic device is further specifically configured to send the media data of the primary electronic device to the secondary electronic device through the established fourth near field network connection. The secondary electronic device is further specifically configured to project the media data of the primary electronic device.

With reference to the fifth aspect, in some implementations of the fifth aspect, when the policy for projecting the media data of the primary electronic device to the secondary electronic device is the first policy, that the relay electronic device is further configured to determine, based on the first message and the second message, a policy for projecting media data of the primary electronic device to the secondary electronic device includes: The primary electronic device is further configured to establish a network connection to the secondary electronic device. The secondary electronic device is further configured to send a fifth message to the primary electronic device through the network connection, where the fifth message is used to request the media data of the primary electronic device. The secondary electronic device is further configured to receive, through the network connection, a sixth message sent by the primary electronic device, where the sixth message includes the media data of the primary electronic device. The secondary electronic device is further configured to project the media data of the primary electronic device based on the sixth message.

With reference to the fifth aspect, in some implementations of the fifth aspect, that the primary electronic device is further configured to establish a network connection to the secondary electronic device includes: The relay electronic device is further configured to send a third message to the primary electronic device, where the third message includes the network connection information of the secondary electronic device. The primary electronic device is further configured to establish the network connection to the secondary electronic device based on the third message.

With reference to the fifth aspect, in some implementations of the fifth aspect, that the primary electronic device is further configured to establish a network connection to the secondary electronic device includes: The relay electronic device is further configured to send a fourth message to the secondary electronic device, where the fourth message includes the network connection information of the primary electronic device. The secondary electronic device is further configured to establish the network connection to the primary electronic device based on the fourth message.

With reference to the fifth aspect, in some implementations of the fifth aspect, the data includes at least one of the following: video data, audio data, document data, or picture data.

According to a sixth aspect, an apparatus is provided. The apparatus is included in a relay electronic device, and the apparatus has a function of implementing behavior of an electronic device in any one of the possible implementations of the first aspect to the fourth aspect. The function may be implemented by hardware, or may be implemented by hardware executing corresponding software. The hardware or the software includes one or more modules or units corresponding to the foregoing function.

According to a seventh aspect, an electronic device is provided, including one or more processors, a memory, and one or more computer programs. The one or more computer programs are stored in the memory. The one or more computer programs include instructions. When the instructions are executed by the electronic device, the electronic device is enabled to perform the data sharing method in any one of the possible implementations of the first aspect to the fourth aspect.

According to an eighth aspect, a computer storage medium is provided, including computer instructions. When the computer instructions are run on an electronic device, the electronic device is enabled to perform the data sharing method in any one of the possible implementations of the first aspect to the fourth aspect.

According to a ninth aspect, a computer program product is provided. When the computer program product runs on an electronic device, the electronic device is enabled to perform the data sharing method in any one of the possible implementations of the first aspect to the fourth aspect.

DETAILED DESCRIPTION OF ILLUSTRATIVE EMBODIMENTS

Terms used in the following embodiments are merely intended to describe specific embodiments, but not to limit this application. The terms "one", "a", and "this" of singular forms used in this specification and the appended claims of this application are also intended to include expressions such as "one or more", unless otherwise specified in the context clearly. It should be further understood that, in the following embodiments of this application, "at least one" and "one or more" mean one, two, or more. The term "and/or" is used to describe an association relationship between associated objects and represents that three relationships may exist. For example, A and/or B may represent the following cases: Only A exists, both A and B exist, and only B exists, where A and B each may be singular or plural. The character "/" usually indicates an "or" relationship between associated objects.

The following describes an electronic device, a user interface used for such an electronic device, and embodiments for using such an electronic device. In some embodiments, the electronic device may be a portable electronic device that further includes other functions such as a personal digital assistant function and/or a music player function, for example, a mobile phone, a tablet computer, or a wearable electronic device with a wireless communication function (for example, a smartwatch). An example embodiment of a portable electronic device includes but is not limited to a portable electronic device using iOS®, Android®, Microsoft®, or another operating system. The portable electronic device may be alternatively another portable electronic device, for example, a laptop (Laptop) computer. It should be further understood that, in some other embodiments, the foregoing electronic device may not be the portable electronic device but a desktop computer.

Figure 1:
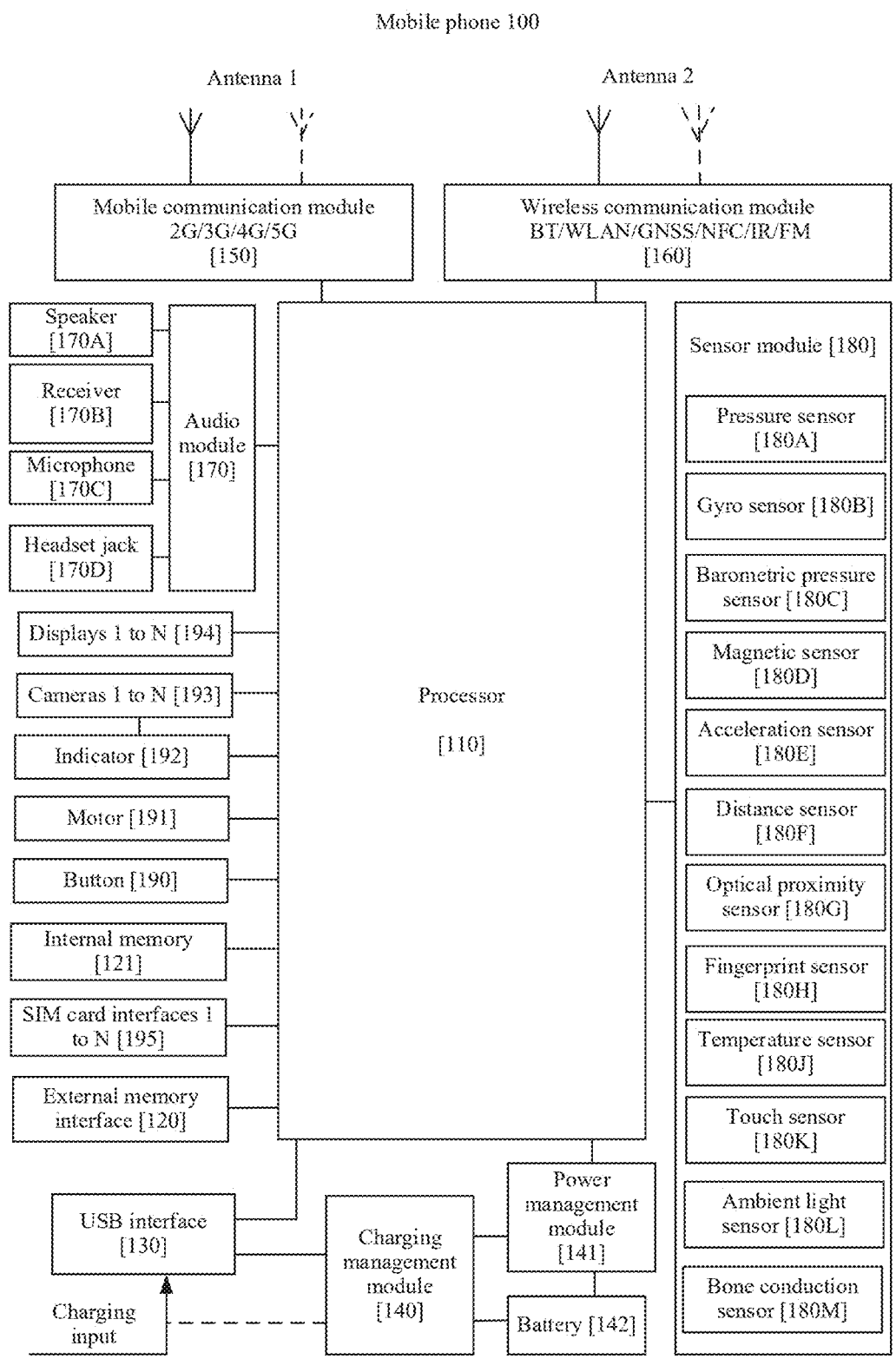
FIG. 1 is a schematic diagram of a structure of an example electronic device according to an embodiment of this application.

For example, FIG. 1 is a schematic diagram of a structure of an electronic device 100. The electronic device 100 may include a processor 110, an external memory interface 120, an internal memory 121, a universal serial bus (universal serial bus, USB) interface 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a compass 190, a motor 191, an indicator 192, a camera 193, a display 194, a subscriber identification module (subscriber identification module, SIM) card interface 195, and the like.

It may be understood that the structure shown in this embodiment of this application does not constitute a specific limitation on the electronic device 100. In some other embodiments of this application, the electronic device 100 may include more or fewer components than those shown in the figure, or some components may be combined, or some components may be split, or there may be a different component layout. The components shown in the figure may be implemented by hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a video codec, a digital signal processor (digital signal processor, DSP), a baseband processor, and/or a neural-network processing unit (neural-network processing unit, NPU). Different processing units may be independent components, or may be integrated into one or more processors. In some embodiments, the electronic device 100 may alternatively include one or more processors 110. The controller may generate an operation control signal based on an instruction operation code and a time sequence signal, to control instruction reading and instruction execution. In some other embodiments, a memory may be further disposed in the processor 110, to store instructions and data. For example, the memory in the processor 110 may be a cache. The memory may store instructions or data that has been used or is cyclically used by the processor 110. If the processor 110 needs to use the instructions or the data again, the processor may directly invoke the instructions or the data from the memory. This avoids repeated access and reduces a waiting time of the processor 110. This improves data processing or instruction execution efficiency of the electronic device 100.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a SIM card interface, a USB interface, and/or the like. The USB interface 130 is an interface that conforms to a USB standard specification, and may be specifically a mini USB interface, a micro USB interface, a USB Type-C interface, or the like. The USB interface 130 may be configured to connect to a charger to charge the electronic device 100, or may be configured to transmit data between the electronic device 100 and a peripheral device. The USB interface 130 may be alternatively configured to connect to a headset to play audio by using the headset.

It may be understood that an interface connection relationship between the modules shown in this embodiment of this application is merely an example for description, and does not constitute a limitation on the structure of the electronic device 100. In some other embodiments of this application, an interface connection manner different from that in the foregoing embodiment or a combination of a plurality of interface connection manners may be alternatively used for the electronic device 100. The charging management module 140 is configured to receive a charging input from a charger. The charging management module 140 may receive a charging input of a wired charger through the USB interface 130. In some embodiments of wireless charging, the charging management module 140 may receive a wireless charging input through a wireless charging coil of the electronic device 100. The charging management module 140 may further supply power to the electronic device by using the power management module 141 while charging the battery 142. The power management module 141 is configured to connect to the battery 142, the charging management module 140, and the processor 110.

A wireless communication function of the electronic device 100 may be implemented by the antenna 1, the antenna 2, the mobile communication module 150, the wireless communication module 160, the modem processor, the baseband processor, and the like.

The wireless communication module 160 may provide a wireless communication solution that is used on the electronic device 100 and that includes a wireless local area network (wireless local area networks, WLAN) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), a near field communication (near field communication, NFC) technology, an infrared (infrared, IR) technology, or the like.

The display 194 is configured to display an image, a video, and the like. The display 194 includes a display panel. The display panel may be a liquid crystal display (liquid crystal display, LCD), an organic light-emitting diode (organic light-emitting diode, OLED), an active-matrix organic light emitting diode (active-matrix organic light emitting diode, AMOLED), a flexible light-emitting diode (flex light-emitting diode, FLED), a mini light-emitting diode (mini light-emitting diode, mini LED), a micro-LED, a micro-OLED, a quantum dot light emitting diode (quantum dot light emitting diodes, QLED), or the like. In some embodiments, the electronic device 100 may include one or more displays 194.

The ISP is configured to process data fed back by the camera 193. For example, during photographing, a shutter is pressed, and light is transmitted to a photosensitive element of the camera through a lens. An optical signal is converted into an electrical signal, and the photosensitive element of the camera transmits the electrical signal to the ISP for processing, to convert the electrical signal into a visible image.

The camera 193 is configured to capture a static image or a video. The external memory interface 120 may be configured to connect to an external storage card, for example, a micro SD card, to extend a storage capability of the electronic device 100.

The external storage card communicates with the processor 110 through the external memory interface 120, to implement a data storage function. For example, files such as music and a video are stored in the external storage card.

The internal memory 121 may be configured to store one or more computer programs, and the one or more computer programs include instructions. The processor 110 may run the instructions stored in the internal memory 121, so that the electronic device 100 performs a data sharing method provided in some embodiments of this application, various applications, data processing, and the like.

The electronic device 100 may implement audio functions, for example, a music playing function and a recording function, by using the audio module 170, the speaker 170A, the receiver 170B, the microphone 170C, the headset jack 170D, the application processor, and the like.

In addition, the electronic device 100 may further include a plurality of sensors, for example, a plurality of sensors shown in FIG. 1. A pressure sensor 180A is configured to sense a pressure signal, and may convert the pressure signal into an electrical signal. A gyro sensor 180B may be configured to determine a motion posture of the electronic device 100. A magnetic sensor 180D includes a Hall effect sensor. An acceleration sensor 180E may detect accelerations in various directions (usually on three axes) of the electronic device 100. A distance sensor 180F is configured to measure a distance. An optical proximity sensor 180G may include, for example, a light-emitting diode (LED), and an optical detector, for example, a photodiode. The light-emitting diode may be an infrared light-emitting diode. An ambient light sensor 180L is configured to sense ambient light brightness. A fingerprint sensor 180H is configured to collect a fingerprint. The electronic device 100 may implement fingerprint-based unlocking, application lock access, fingerprint-based photographing, fingerprint-based call answering, and the like by using a feature of the collected fingerprint. A temperature sensor 180J is configured to detect a temperature. A touch sensor 180K is also referred to as a "touch panel". The touch sensor 180K may be disposed on the display 194, and the touch sensor 180K and the display 194 form a touchscreen. The touchscreen is also referred to as a "touch control screen". The touch sensor 180K is configured to detect a touch operation performed on or near the touch sensor. The touch sensor may transfer the detected touch operation to the application processor to determine a type of a touch event. A visual output related to the touch operation may be provided by using the display 194. In some other embodiments, the touch sensor 180K may be alternatively disposed on a surface of the electronic device 100 at a location different from a location of the display 194.

Figure 2:
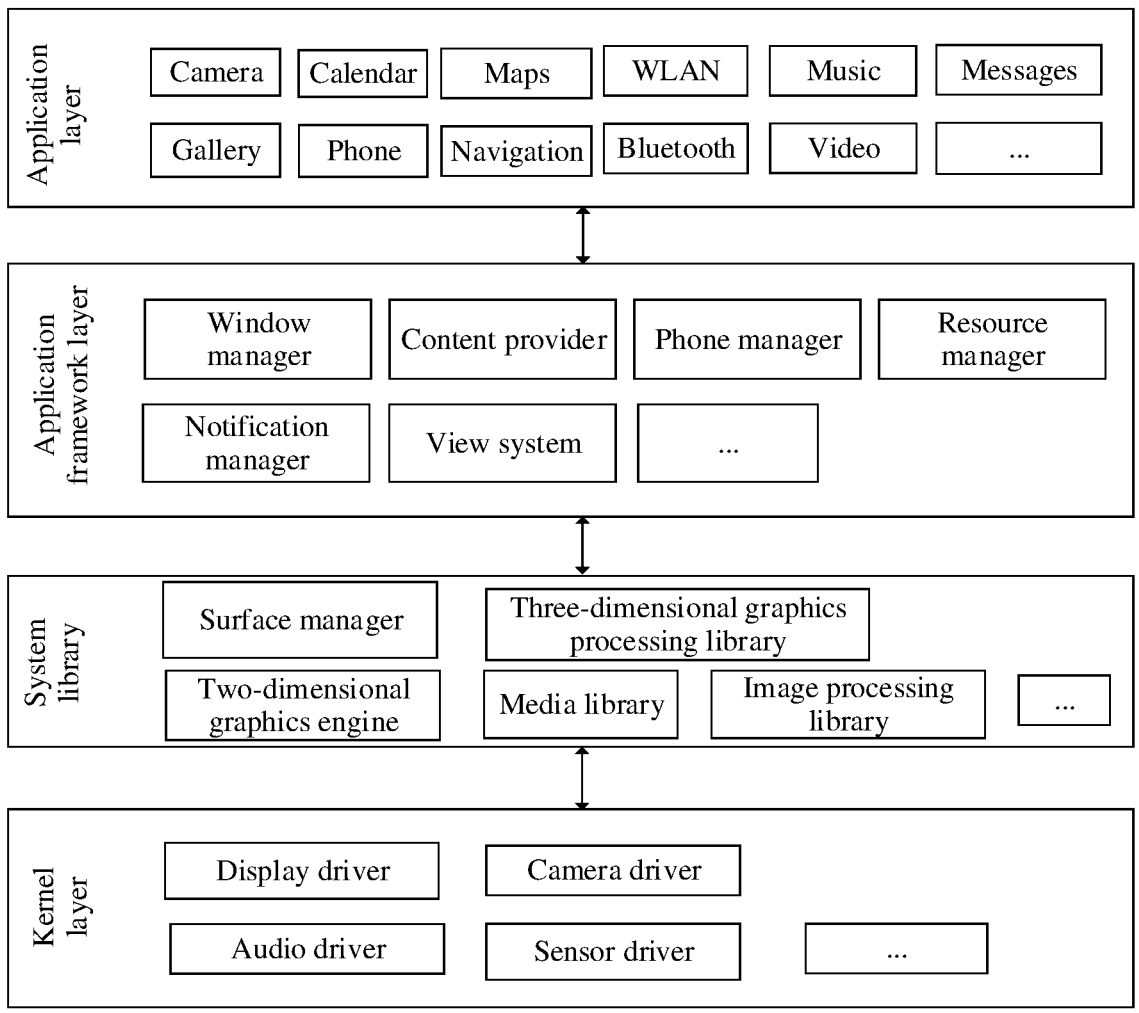
FIG. 2 is a block diagram of a software structure of an electronic device according to an embodiment of this application.

FIG. 2 is a block diagram of a software structure of an example electronic device 100 according to an embodiment of this application. In a layered architecture, software is divided into several layers, and each layer has a clear role and task. The layers communicate with each other through a software interface. In some embodiments, an Android system is divided into four layers: an application layer, an application framework layer, an Android runtime (Android runtime) and system library, and a kernel layer from top to bottom. The application layer may include a series of application packages.

As shown in FIG. 2, with reference to descriptions of this embodiment of this application, the application packages may include applications such as Camera, Gallery, Messages, Contacts, Weather, Music, Pocket, Task Card Store, Settings, Album, Video, Browser, Huawei Vmall, and a desktop application. The desktop application may control a display size, location coordinates, a display effect, and the like of an interface element such as an application icon or a control on an interface of the electronic device.

The application framework layer provides an application programming interface (application programming interface, API) and a programming framework for an application at the application layer. The application framework layer includes some predefined functions.

As shown in FIG. 2, the application framework layer may include a window manager, a content provider, a view system, a phone manager, a resource manager, a notification manager, and the like.

The window manager is configured to manage a window program. The window manager may obtain a size of a display, determine whether there is a status bar, perform screen locking, take a screenshot, and the like. In this application, the window manager may participate in a process of displaying an interface element of the display.

The content provider is configured to store and obtain data, and enable the data to be accessed by an application. The data may include a video, an image, audio, calls that are made and answered, a browsing history and bookmarks, a phone book, and the like.

The view system includes visual controls, such as a control for displaying a text and a control for displaying a picture. The view system may be configured to construct an application. A display interface may include one or more views. For example, displaying of an application icon on a display interface, or a display interface including an SMS message notification icon may include a view for displaying a text and a view for displaying a picture.

The phone manager is configured to provide a communication function for the electronic device 100, for example, management of a call status (including answering, hanging up, or the like).

The resource manager provides, for an application, various resources such as a localized character string, an icon, a picture, a layout file, and a video file.

The notification manager enables an application to display notification information in the status bar, and may be configured to transmit a notification-type message. The displayed information may automatically disappear after a short pause without user interaction. For example, the notification manager is configured to notify a user of download completion or provide a message notification. The notification manager may be alternatively a notification that appears in a top status bar of the system in a form of a graph or a scroll bar text, for example, a notification for an application running in the background or a notification that appears on a screen in a form of a dialog window. For example, text information is prompted in the status bar, or notification is performed through an alert tone, vibration, blinking of an indicator, or the like.

The Android runtime includes a kernel library and a virtual machine. The Android runtime is responsible for scheduling and management of the Android system.

The kernel library includes two parts: a function that needs to be invoked in Java language and a kernel library of Android.

The application layer and the application framework layer run on the virtual machine. The virtual machine executes Java files at the application layer and the application framework layer as binary files. The virtual machine is configured to perform functions such as object lifecycle management, stack management, thread management, security and exception management, and garbage collection.

The system library may include a plurality of functional modules, for example, a surface manager (surface manager), a media library (media libraries), a three-dimensional graphics processing library (for example, an OpenGL ES), and a 2D graphics engine (for example, an SGL).

The surface manager is configured to manage a display subsystem and provide fusion of 2D and 3D layers for a plurality of applications.

The media library supports playing and recording of a plurality of commonly used audio and video formats, static image files, and the like. The media library may support a plurality of audio and video encoding formats such as MPEG-4, H.264, MP3, AAC, AMR, JPG, and PNG.

The three-dimensional graphics processing library is configured to implement three-dimensional graphics drawing, image rendering, composition, layer processing, and the like. The 2D graphics engine is a drawing engine for 2D drawing.

In this application, the surface manager, the three-dimensional graphics processing library, and the like may participate in a process of displaying an interface element of the electronic device. A specific display process is not described herein.

The kernel layer is a layer between hardware and software. The kernel layer includes at least a display driver, a sensor driver, and the like.

For ease of understanding, in the following embodiments of this application, the electronic device with the structures shown in FIG. 1 and FIG. 2 is used as an example to describe in detail a data sharing method provided in embodiments of this application with reference to accompanying drawings and application scenarios.

Application scenarios of the data sharing method provided in this application are not limited in this application. For example, an application scenario of the data sharing method provided in embodiments of this application may be a home scenario or an office scenario.

Application scenarios of a data sharing method provided in embodiments of this application are described below by using FIG. 3, FIG. 4, FIG. 6, and FIG. 7 as examples. It should be understood that various application scenarios and devices shown in FIG. 3, FIG. 4, FIG. 6, and FIG. 7 are merely examples of embodiments of this application. Any application scenario in FIG. 3, FIG. 4, FIG. 6, and FIG. 7 may further include more devices.

Vision in embodiments of this application may also be referred to as a smart television, and is an electronic device that has a large screen and on which an operating system is installed.

Figure 3:
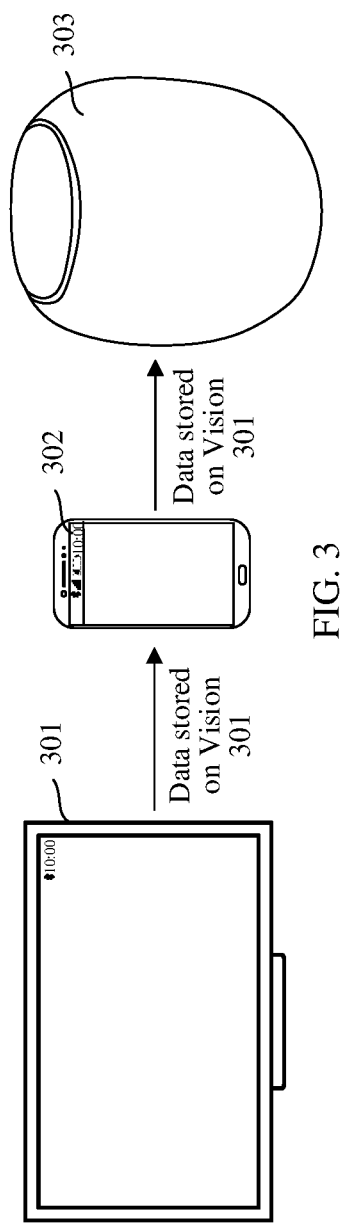
FIG. 3 is a schematic diagram of an example application scenario of a data sharing method according to an embodiment of this application.
Figure 4:
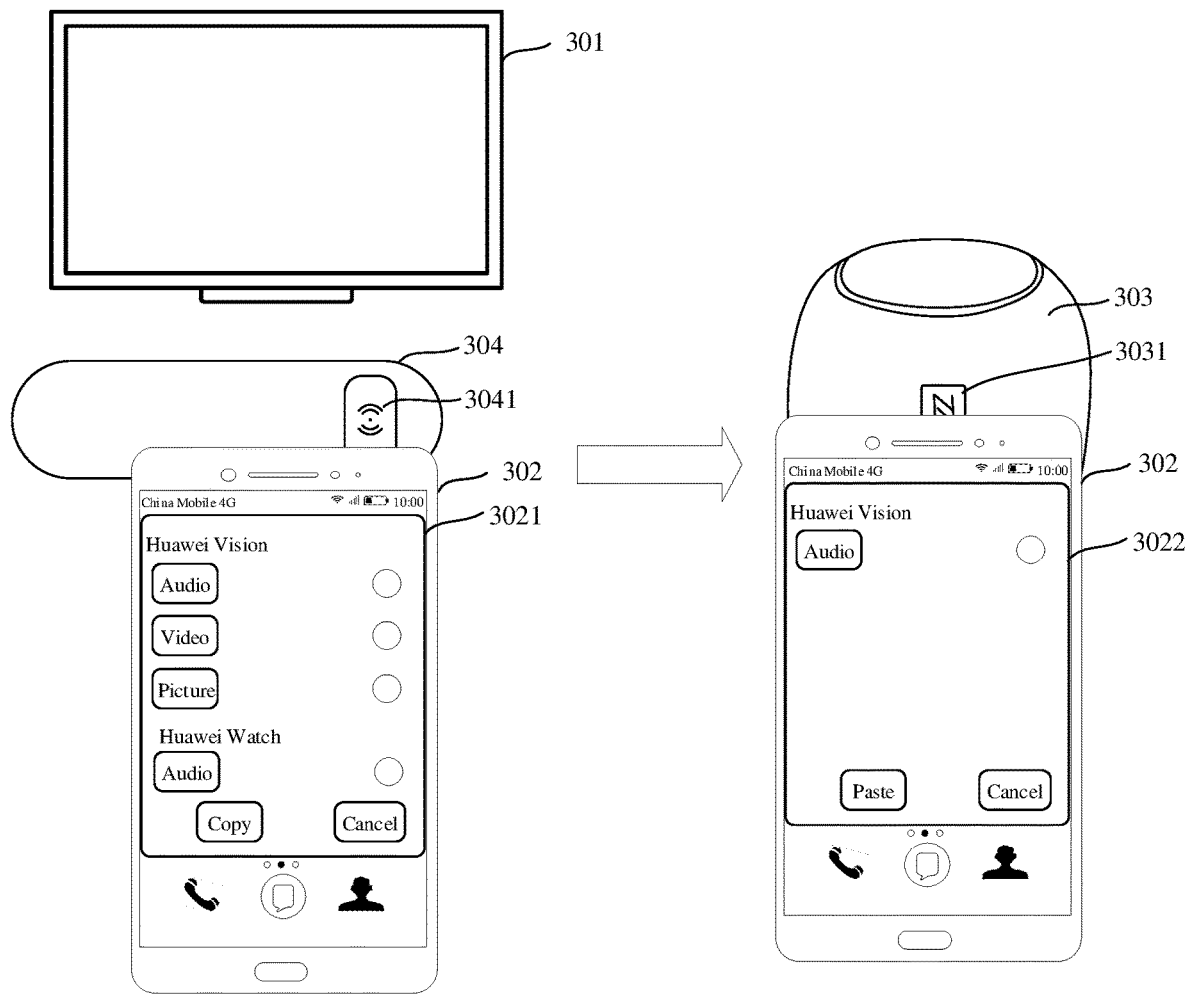
FIG. 4 is a schematic diagram of another example application scenario of a data sharing method according to an embodiment of this application.

FIG. 3 and FIG. 4 are schematic diagrams of an example application scenario according to an embodiment of this application.

As shown in FIG. 3 and FIG. 4, the application scenario may include Vision 301, a mobile phone 302, and a smart speaker 303.

As shown in FIG. 4, the application scenario further includes a remote control 304 of Vision 301. The remote control 304 includes an NFC sensing area 3041. The smart speaker 303 includes an NFC sensing area 3031.

When a user needs to share audio data stored on Vision 301 to the smart speaker 303, the user may implement this by using the mobile phone 302. To be specific, the mobile phone 302 serves as a relay electronic device to share the data stored on Vision 301 to the smart speaker 303.

Figure 5:
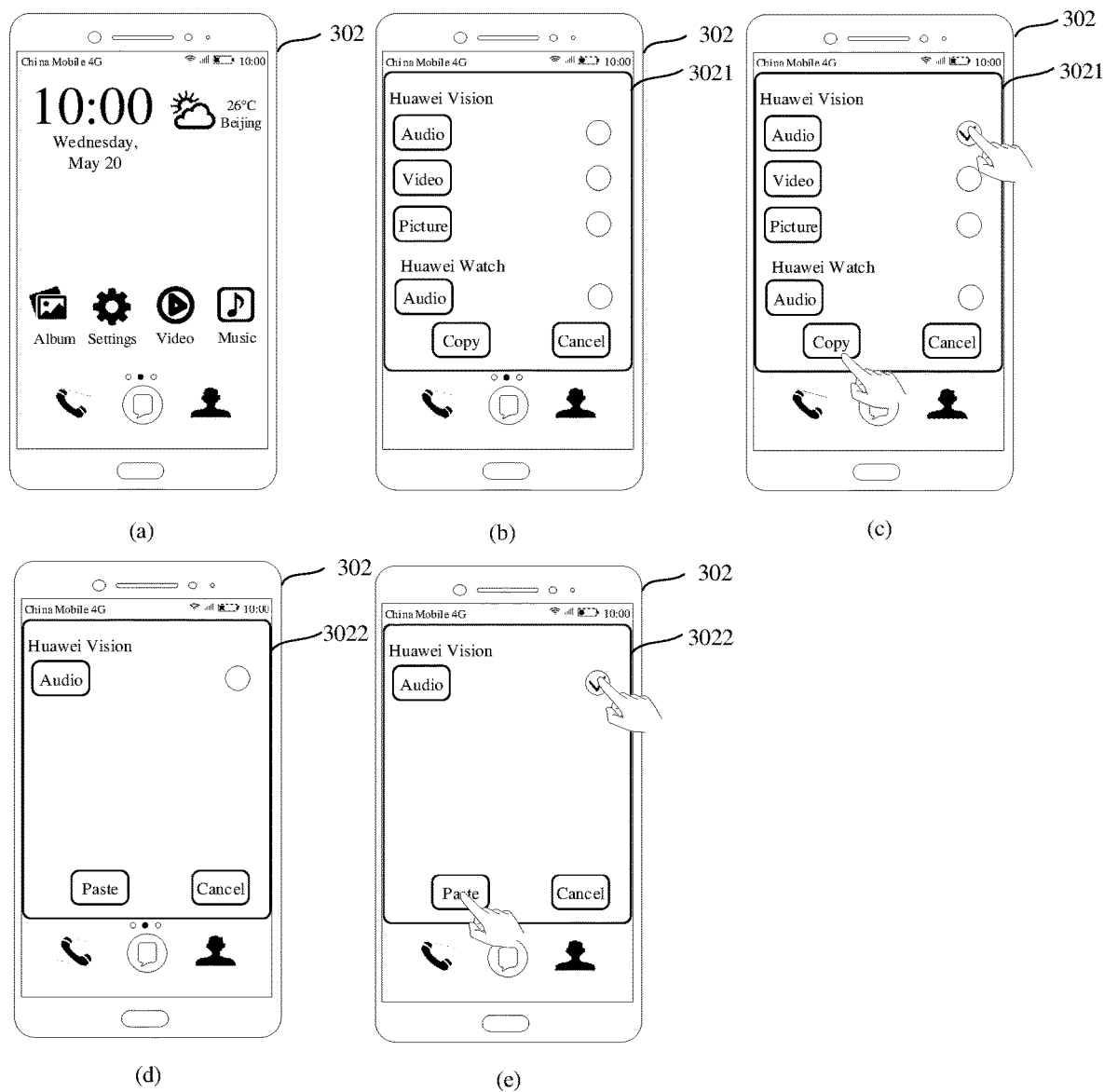
FIG. 5 shows a set of GUIs according to an embodiment of this application.

In a process in which the mobile phone 302 serves as a relay electronic device to share data stored on Vision 301 to the smart speaker 303, a change of a graphical user interface (graphical user interface, GUI) on the mobile phone 302 is shown in FIG. 5.

FIG. 5 shows a set of GUIs on the mobile phone 302.

As shown in (a) in FIG. 5, a GUI is a desktop of the mobile phone 302. The user places the mobile phone 302 close to Vision 301, and establishes a near field wireless connection between the mobile phone 302 and Vision 301. For example, as shown in FIG. 3, the user establishes a BT connection between the mobile phone 302 and Vision 301. For another example, as shown in FIG. 4, the user places an NFC sensing area of the mobile phone 302 close to the NFC sensing area 3041 of the remote control 304, to establish an NFC connection between the mobile phone 302 and Vision 301. After a near field wireless connection is established between the mobile phone 302 and Vision 301, the mobile phone 302 displays a GUI shown in (b) in FIG. 5.

For devices that have established near field wireless connections to the mobile phone 302, the mobile phone 302 may send file requests to the devices, to request media files (for example, video files, audio files, document files, or picture files) stored on the devices, so that the media files of the devices are displayed on the mobile phone 302.

As shown in (b) in FIG. 5, a window 3021 may be displayed on the display interface, and the window 3021 may display information, obtained by the mobile phone 302, about another device that has established a near field wireless connection to the mobile phone 302. The information about the another device may include a device name of the another device and a media file stored on the another device. The media file may include at least one of the following: a video file, an audio file, a document file, or a picture file. As shown in (b) in FIG. 5, the window 3021 displays "Huawei Vision" (for example, the Huawei Vision is a device name of Vision 301 shown in FIG. 3) and a video file, an audio file, and a picture file that are stored on the Huawei Vision. The window 3021 may further display "Huawei Watch" and an audio file stored on the Huawei Watch.

After detecting an operation of a gesture 1 of the user, the mobile phone 302 performs an operation corresponding to the operation of the gesture 1.

For example, the operation of the gesture 1 may be an operation of selecting a media file.

A specific form of the operation of selecting the media file is not limited in this application. For example, the operation of selecting the media file may be a tap operation, a touch and hold operation, or a specified mid-air gesture operation.

For example, after the mobile phone 302 detects an operation of tapping a corresponding media file by the user and detects an operation of tapping a "copy" control by the user, the mobile phone 302 stores, on the mobile phone 302, the media file selected by the user. For example, as shown in (c) in FIG. 5, after the mobile phone 302 detects an operation of selecting, by the user, audio stored on the Huawei Vision and detects an operation of tapping the "copy" control by the user, the mobile phone 302 stores, on the mobile phone 302, the audio stored on the Huawei Vision.

For another example, after the mobile phone 302 detects an operation of selecting a media file by the user (for example, an operation of touching and holding a media file), the mobile phone 302 stores, on the mobile phone 302, the media file selected by the user (the media file that is touched and held).

GUIs in (a) in FIG. 5 to (c) in FIG. 5 show a process in which after the mobile phone 302 establishes a near field wireless connection to another device, the mobile phone 302 stores, on the mobile phone 302, a media file selected by the user on the another device that has established the near field wireless connection to the mobile phone 302. GUIs in (d) in FIG. 5 and (e) in FIG. 5 show a process in which after the mobile phone 302 establishes a near field wireless connection to another device, the mobile phone 302 shares, to the another device that has established the near field wireless connection to the mobile phone 302, a media file on another device that is stored on the mobile phone 302 (for example, the media file selected by the user in (a) in FIG. 5 to (c) in FIG. 5).

After the mobile phone 302 stores a media file of another device (for example, the Huawei Vision), the user may establish a near field connection between the mobile phone 302 and another device again. For example, as shown in FIG. 3, the user establishes a BT connection between the mobile phone 302 and the smart speaker 303. For another example, as shown in FIG. 4, the user places the NFC sensing area of the mobile phone 302 close to the NFC sensing area 3031 of the smart speaker 303, to establish an NFC connection between the mobile phone 302 and the smart speaker 303. After a near field wireless connection is established between the mobile phone 302 and the smart speaker 303, the mobile phone 302 may further display a GUI shown in (d) in FIG. 5.

For another device that has established a near field wireless connection to the mobile phone 302, the mobile phone 302 may display, on the mobile phone 302, a media file on the another device that has been stored on the mobile phone 302.

As shown in (d) in FIG. 5, a window 3022 may be displayed on the display interface, and the window 3022 may display information about another device that has been stored on the mobile phone 302. The information about the another device may include a device name of the another device and a media file of the another device that has been stored. The media file may include at least one of the following: a video file, an audio file, a document file, or a picture file. As shown in (d) in FIG. 5, the window 3022 displays "Huawei Vision" and an audio file on the Huawei Vision that has been stored.

After detecting an operation of a gesture 2 of the user, the mobile phone 302 performs an operation corresponding to the operation of the gesture 2.

For example, the operation of the gesture 2 may also be an operation of selecting a media file.

For example, after the mobile phone 302 detects an operation of tapping a corresponding media file by the user and detects an operation of tapping a "paste" control by the user, the mobile phone 302 shares the media file selected by the user (a media file on another device that has been stored on the mobile phone 302) to another device that has established a near field wireless connection to the mobile phone 302. For example, as shown in (e) in FIG. 5, after the mobile phone 302 detects an operation of selecting, by the user, audio on the Huawei Vision that has been stored on the mobile phone 302, and detects an operation of tapping the "paste" control by the user, the mobile phone 302 shares the audio on the Huawei Vision that has been stored to another device that has established a Wi-Fi connection or a BT connection to the mobile phone 302 (for example, the smart speaker 303 shown in FIG. 3 and FIG. 5).

For another example, when the mobile phone 302 detects an operation of selecting a media file by the user (for example, an operation of touching and holding and swiping along a first direction), the mobile phone 302 shares the media file selected by the user (a media file on another device that has been stored on the mobile phone 302 on which touching and holding and swiping along the first direction are performed) to another device that has established a near field wireless connection to the mobile phone in the first direction of the mobile phone 302 (for example, the smart speaker 303 shown in FIG. 3 and FIG. 5).

Figure 6:
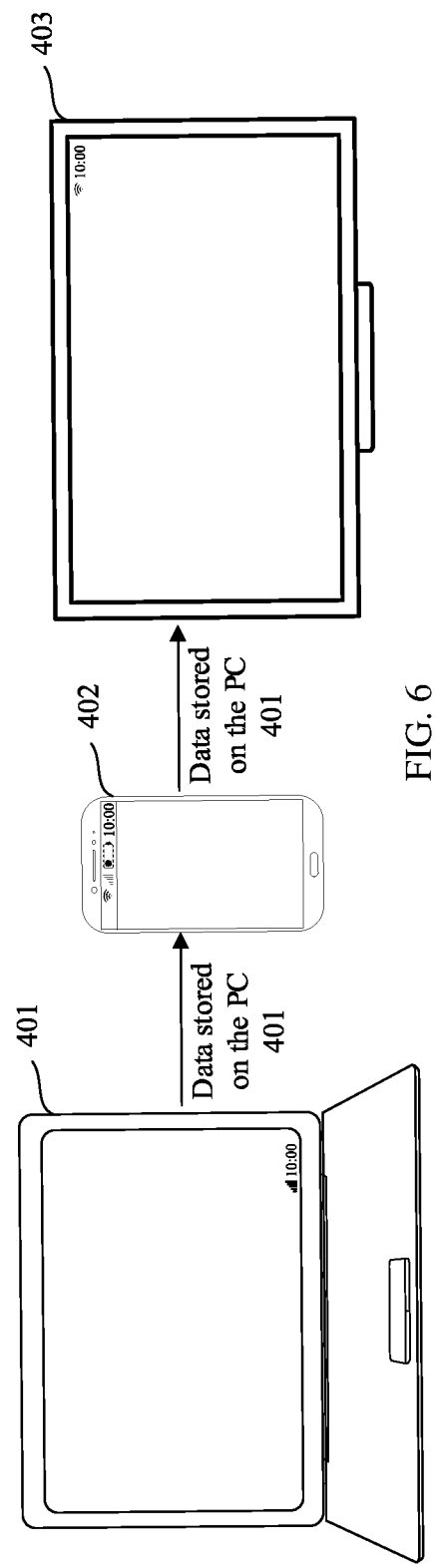
FIG. 6 is a schematic diagram of still another example application scenario of a data sharing method according to an embodiment of this application.
Figure 7:
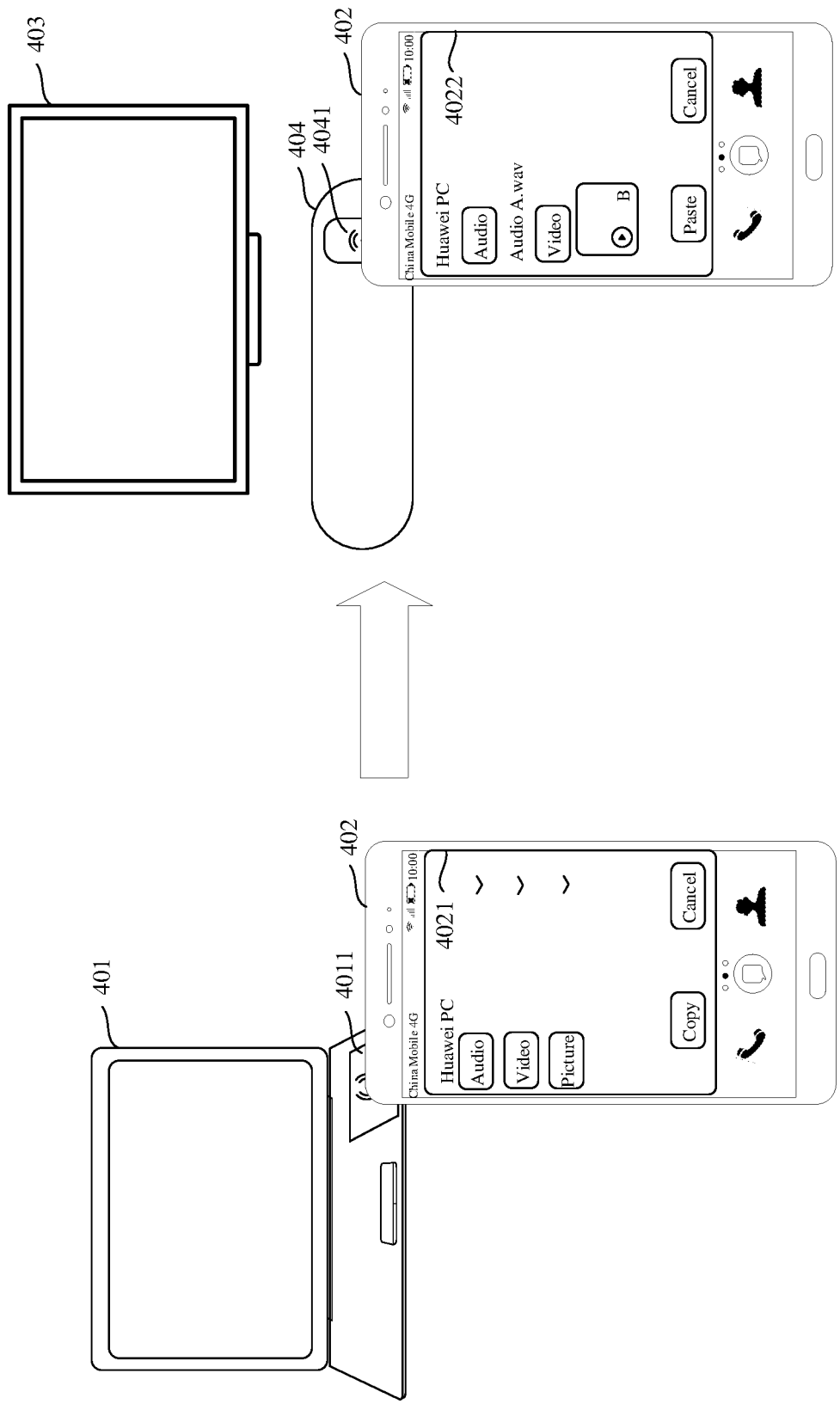
FIG. 7 is a schematic diagram of still another example application scenario of a data sharing method according to an embodiment of this application.

FIG. 6 and FIG. 7 are schematic diagrams of another example application scenario according to an embodiment of this application.

As shown in FIG. 6 and FIG. 7, the application scenario may include a personal computer (personal computer, PC) 401, a mobile phone 402, and Vision 403.

As shown in FIG. 7, the application scenario further includes a remote control 404 of Vision 403. The remote control 404 includes an NFC sensing area 4041. The PC 401 includes an NFC sensing area 4011.

When a user needs to share a video file and an audio file that are stored on the PC 401 to Vision 403, the user may implement this by using the mobile phone 402. To be specific, the mobile phone 402 serves as a relay electronic device to share the video file and the audio file that are stored on the PC 401 to Vision 403.

Figure 8:
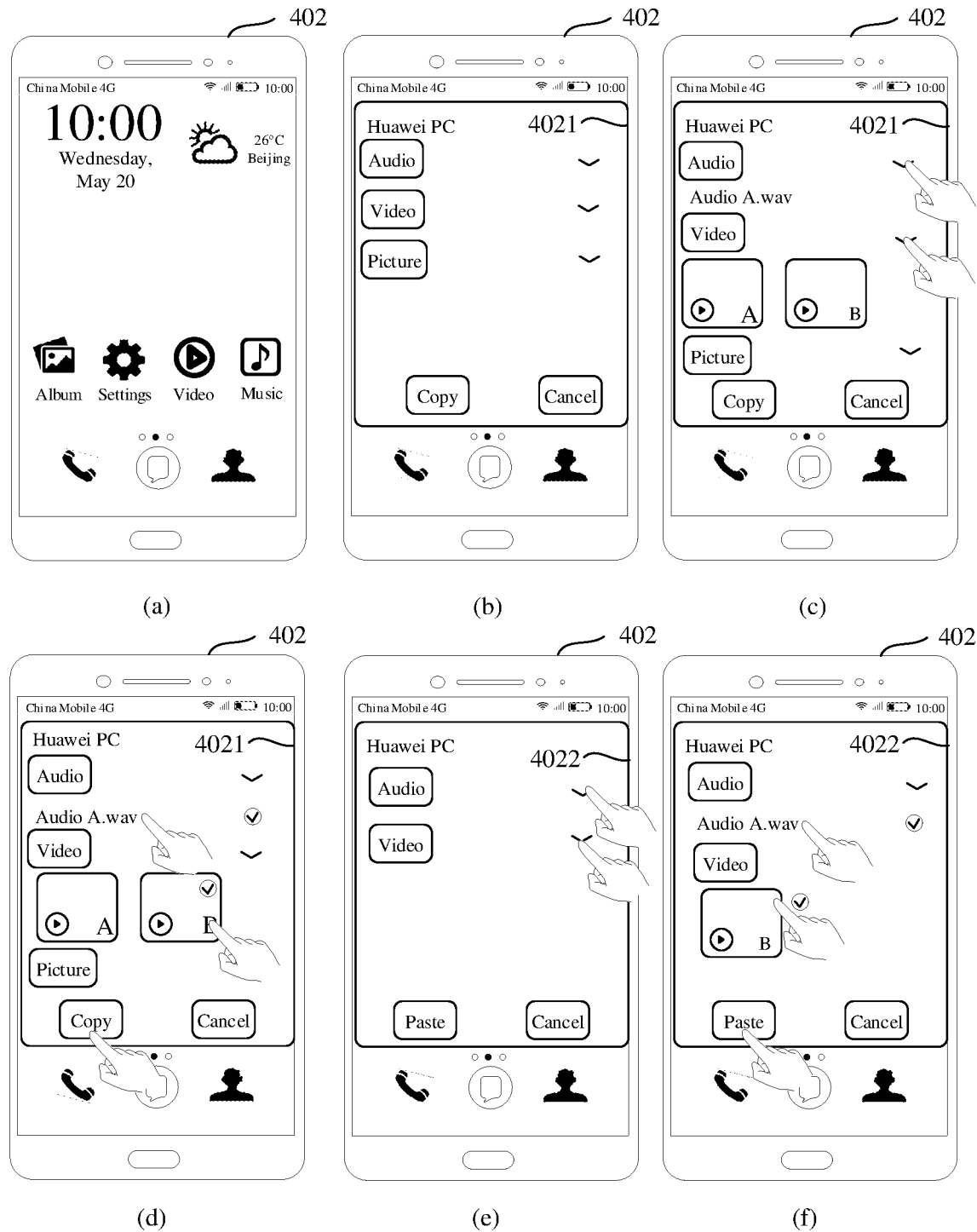
FIG. 8 shows another set of GUIs according to an embodiment of this application.

In a process in which the mobile phone 402 serves as a relay electronic device to share a file stored on the PC 401 to Vision 403, a change of a graphical user interface (graphical user interface, GUI) on the mobile phone 402 is shown in FIG. 8.

FIG. 8 shows a set of GUIs on the mobile phone 402.

As shown in (a) in FIG. 8, a GUI is a desktop of the mobile phone 402. The user places the mobile phone 402 close to the PC 401, and establishes a near field wireless connection between the mobile phone 402 and the PC 401. For example, as shown in FIG. 6, the user establishes a Wi-Fi connection between the mobile phone 402 and the PC 401. For another example, as shown in FIG. 7, the user places an NFC sensing area of the mobile phone 402 close to the sensing area 4011 of the PC 401, to establish an NFC connection between the mobile phone 402 and the PC 401. After a near field wireless connection is established between the mobile phone 402 and the PC 401, the mobile phone 402 displays a GUI shown in (b) in FIG. 8.

As shown in (b) in FIG. 8, compared with (b) in FIG. 5, in addition to a device name of another device, a media file stored on the another device, and a control corresponding to the media file stored on the another device, information about the another device that is displayed in a window 4021 on the mobile phone 402 further includes specific files included in the media file stored on the another device. For example, as shown in (c) in FIG. 8, after the mobile phone 402 detects an operation of tapping, by the user, a control corresponding to an audio file stored on a Huawei PC, the mobile phone 402 may further display specific audio included in the audio file stored on the Huawei PC. For example, as shown in (c) in FIG. 8, the audio file stored on the Huawei PC specifically includes audio A. After the mobile phone 402 detects an operation of tapping, by the user, a control corresponding to a video file stored on the Huawei PC, the mobile phone 402 may further display a specific video included in the video file stored on the Huawei PC. For example, as shown in (c) in FIG. 8, the video file stored on the Huawei PC includes a video A and a video B.

After detecting an operation of a gesture 1 of the user, the mobile phone 402 performs an operation corresponding to the operation of the gesture 1. For details, refer to corresponding descriptions of FIG. 5. Details are not described herein again.

GUIs in (a) in FIG. 8 to (d) in FIG. 8 show a process in which after the mobile phone 402 establishes a near field wireless connection to another device, the mobile phone 402 stores, on the mobile phone 402, a media file selected by the user on the another device that has established the near field wireless connection to the mobile phone 402. GUIs in (e) in FIG. 8 and (f) in FIG. 5 show a process in which after the mobile phone 402 establishes a near field wireless connection to another device, the mobile phone 402 shares, to the another device that has established the near field wireless connection to the mobile phone 402, a media file on another device that is stored on the mobile phone 402 (for example, the media file selected by the user in (a) in FIG. 8 to (d) in FIG. 8).

After the mobile phone 402 stores a media file of another device (for example, the Huawei PC), the user may establish a near field connection between the mobile phone 402 and another device again. For example, as shown in FIG. 6, the user establishes a BT connection between the mobile phone 402 and Vision 403. For another example, as shown in FIG. 7, the user places the NFC sensing area of the mobile phone 402 close to the sensing area 4041 of the remote control 404, to establish an NFC connection between the mobile phone 402 and Vision 403. After a near field wireless connection is established between the mobile phone 402 and Vision 403, the mobile phone 302 may further display a GUI shown in (e) in FIG. 8.

As shown in (e) in FIG. 8, compared with (d) in FIG. 5, in addition to a device name of another device, a media file stored on the another device, and a control corresponding to the media file stored on the another device, information about the another device that is displayed in a window 4022 on the mobile phone 402 further includes specific files included in the media file stored on the another device. For example, as shown in (e) in FIG. 8, after the mobile phone 402 detects an operation of tapping, by the user, a control corresponding to an audio file stored on a Huawei PC, the mobile phone 402 may further display specific audio included in the audio file stored on the Huawei PC. For example, as shown in (f) in FIG. 8, the audio file stored on the Huawei PC specifically includes audio A. After the mobile phone 402 detects an operation of tapping, by the user, a control corresponding to a video file stored on the Huawei PC, the mobile phone 402 may further display a specific video included in the video file stored on the Huawei PC. For example, as shown in (f) in FIG. 8, the video file stored on the Huawei PC includes a video B.

After detecting an operation of a gesture 2 of the user, the mobile phone 402 performs an operation corresponding to the operation of the gesture 2. For details, refer to corresponding descriptions of FIG. 5. Details are not described herein again.

Figure 9:
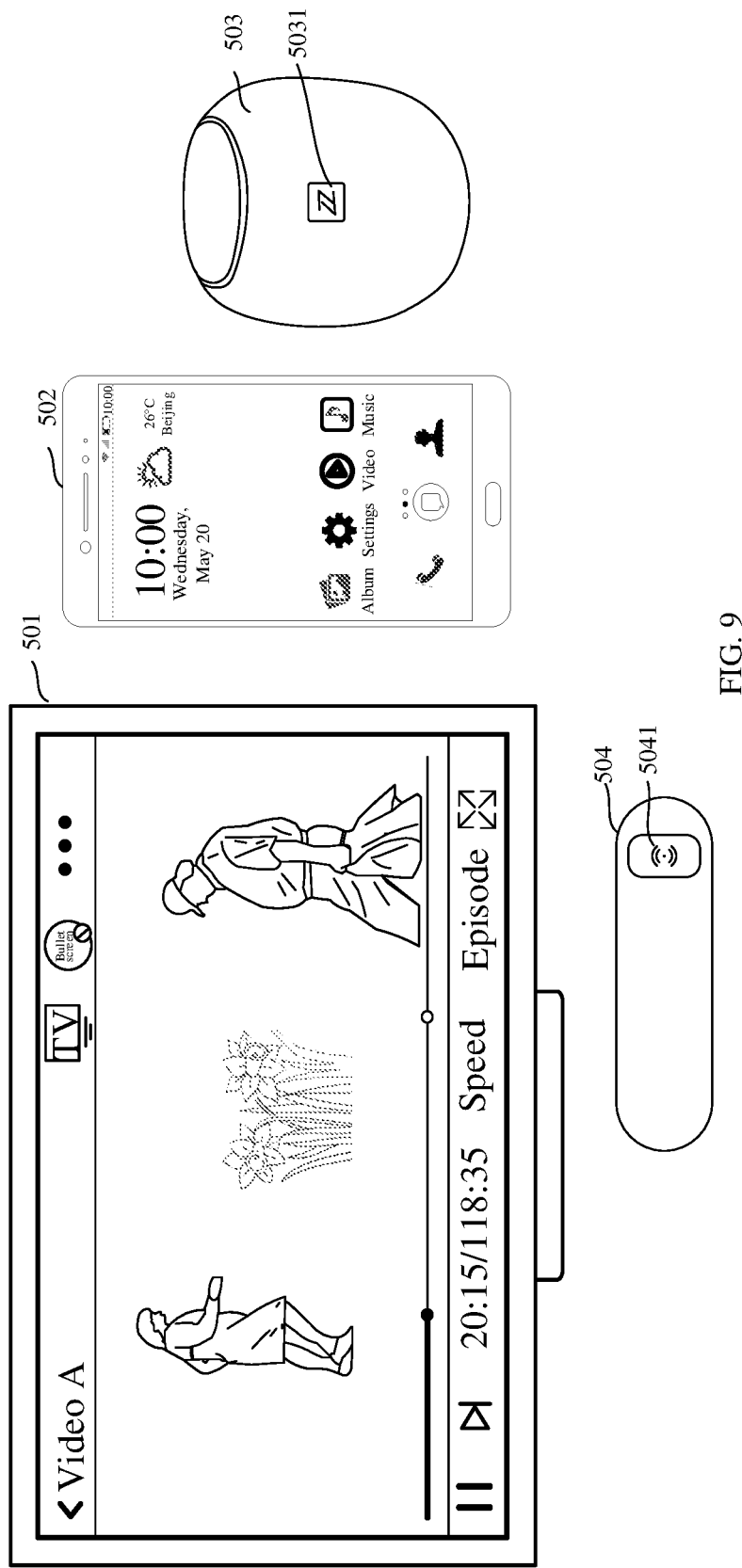
FIG. 9 is a schematic diagram of still another example application scenario of a data sharing method according to an embodiment of this application.
Figure 12:
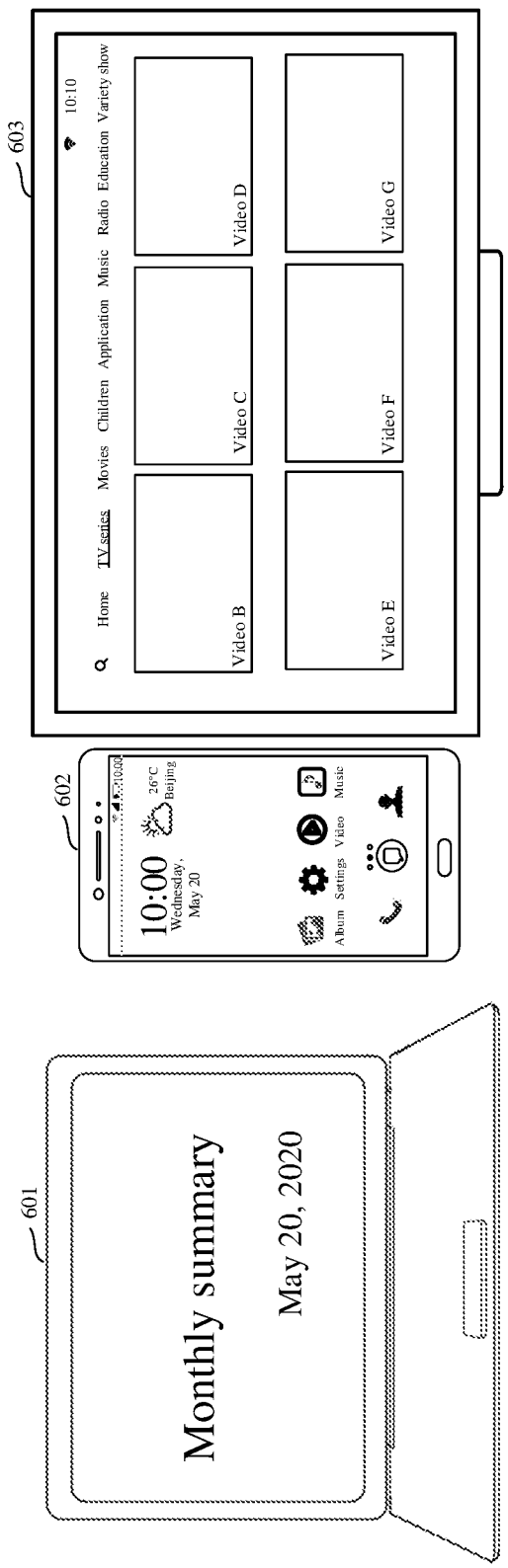
FIG. 12 is a schematic diagram of still another example application scenario of a data sharing method according to an embodiment of this application.

Application scenarios of another data sharing method provided in embodiments of this application are described below by using FIG. 9 and FIG. 12 as examples. It should be understood that various application scenarios and devices shown in FIG. 9 and FIG. 12 are merely examples of embodiments of this application. Any application scenario in FIG. 9 and FIG. 12 may further include more devices.

As shown in FIG. 9, the application scenario may include Vision 501, a remote control 504 of Vision 501, a mobile phone 502, and a smart speaker 503. The remote control 504 includes an NFC sensing area 5041. The smart speaker 503 includes an NFC sensing area 5031.

Vision 501 is playing media data. For example, the data includes at least one of the following: video data, audio data, document data, or picture data. For example, as shown in a leftmost diagram in FIG. 9, Vision 501 is playing a video A. In this case, Vision 501 communicates with another device by using a Wi-Fi network technology or an NFC technology.

The mobile phone 502 may display a desktop of the mobile phone 502. For example, refer to a diagram in the middle of FIG. 9.

The smart speaker 503 may be in a standby state. For example, refer to a rightmost diagram in FIG. 9. In this case, the smart speaker 503 communicates with another device by using a BT network technology or an NFC technology.

Figure 10:
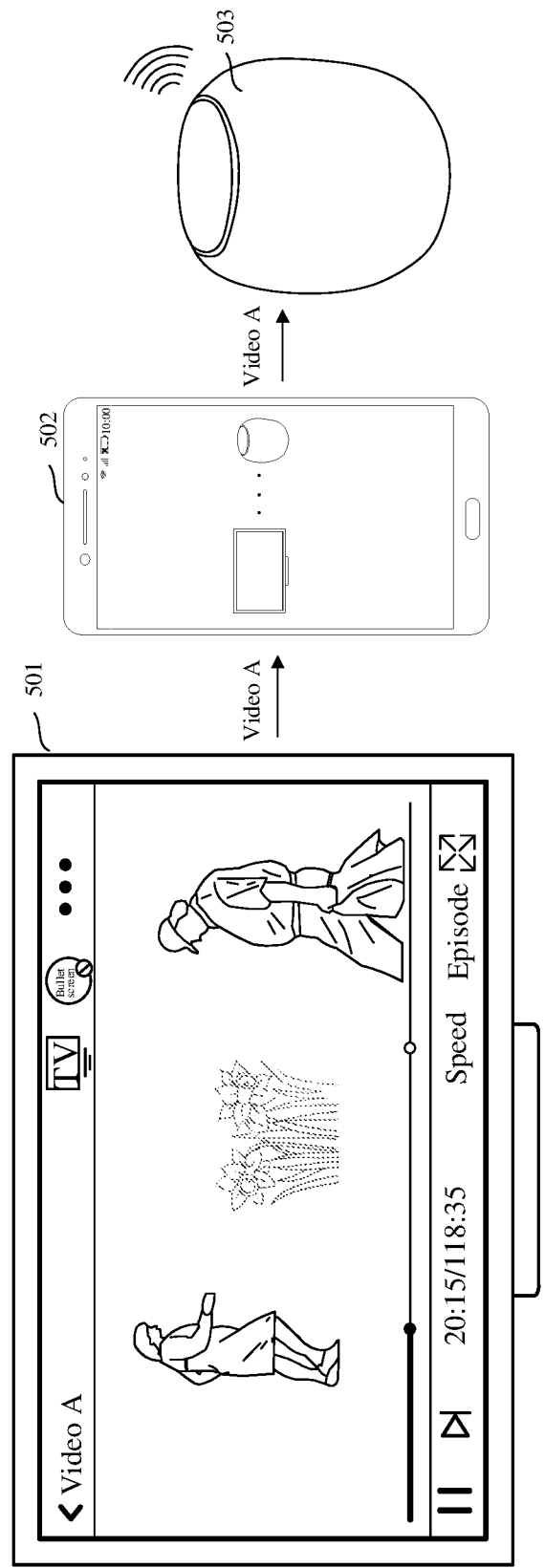
FIG. 10 is a schematic diagram of an example of data sharing between Vision and a smart speaker according to an embodiment of this application.

When a user needs to transmit the media data being played on Vision 501 to the smart speaker 503, because Vision 501 communicates with another device through a Wi-Fi network and the smart speaker 503 communicates with another device through a BT network, network connection modes used by Vision 501 and the smart speaker 503 are different, and therefore the media data being played on Vision 501 needs to be projected to the smart speaker 503 by using the mobile phone 502. FIG. 10 is a schematic diagram of a process in which the mobile phone 502 projects the media data being played on Vision 501 to the smart speaker 503.

Figure 11:
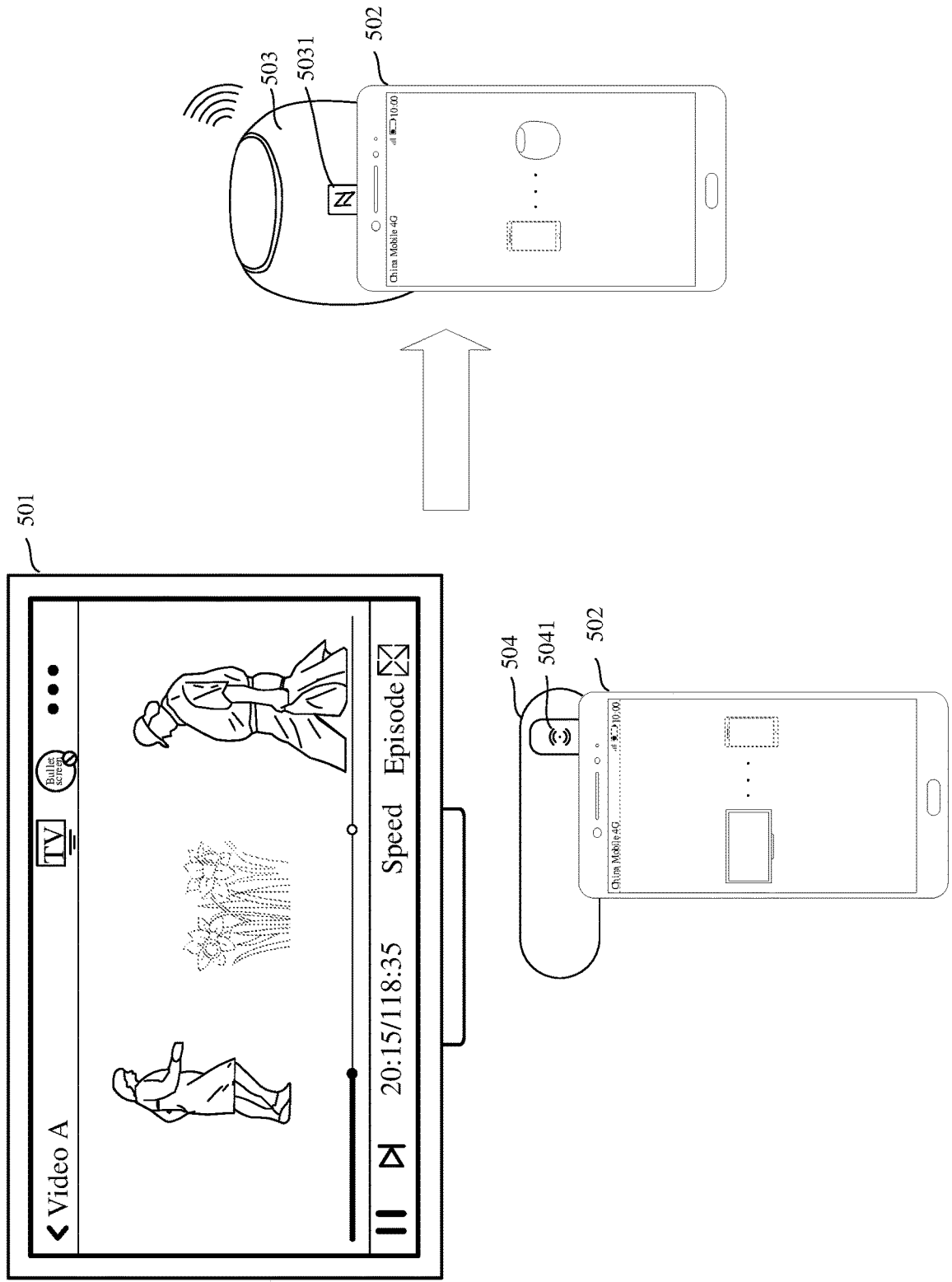
FIG. 11 is a schematic diagram of another example of data sharing between Vision and a smart speaker according to an embodiment of this application.

The user places the mobile phone 502 close to Vision 501, and establishes a near field wireless connection between the mobile phone 502 and Vision 501. For example, as shown in FIG. 10, the user establishes a Wi-Fi connection between the mobile phone 502 and Vision 501. For another example, as shown in FIG. 11, the user places an NFC sensing area of the mobile phone 502 close to the sensing area 5041 of the remote control 504, to establish an NFC connection between the mobile phone 502 and Vision 501. After a near field wireless connection is established between the mobile phone 502 and Vision 501, Vision 501 dynamically encodes the media data being played, and dynamically transmits encoded media data of Vision 501 to the mobile phone 502 through the near field wireless connection.

After Vision 501 transmits the media data to the mobile phone 502, the user places the mobile phone 502 close to the smart speaker 503 again, and establishes a near field wireless connection between the mobile phone 502 and the smart speaker 503. For example, as shown in FIG. 10, the user establishes a BT connection between the mobile phone 502 and the smart speaker 503. For another example, as shown in FIG. 11, the user places the NFC sensing area of the mobile phone 502 close to the sensing area 5011 of the smart speaker 503, to establish an NFC connection between the mobile phone 502 and the smart speaker 503. After a near field wireless connection is established between the mobile phone 502 and the smart speaker 5031, the mobile phone 502 may dynamically forward the encoded media data to the smart speaker 503. The smart speaker 503 dynamically decodes the encoded media data to obtain an identifier of the media data being played on Vision 501, the media data being played on Vision 501, and an address of the media data being played on Vision 501; and dynamically continues to play the media data being played on Vision 501, based on the identifier of the media data being played on Vision 501, the media data being played on Vision 501, and the address of the media data being played on Vision 501.

Optionally, in a process in which the mobile phone 502 dynamically forwards the encoded media data to the smart speaker 503, information indicating that the data is being transmitted may be displayed on the mobile phone 502.

For example, a dynamic image indicating that the data is being transmitted by Vision 501 to the smart speaker 503 may be displayed on the mobile phone 502. For example, refer to an interface displayed on the mobile phone 502 in FIG. 10.

For example, a dynamic image indicating that the data is being transmitted by the mobile phone 502 to the smart speaker 503 may be displayed on the mobile phone 502. For example, refer to an interface displayed on the mobile phone 502 in FIG. 11.

For example, as shown in FIG. 10 and FIG. 11, Vision 501 is playing the video A. Vision 501 encodes the video A, and sends an encoded video A to the mobile phone 502. The mobile phone 502 forwards the encoded video A to the smart speaker 503. The smart speaker 503 decodes the video A, and synchronously plays audio of the video A being played on Vision 501, so that media data being played on Vision 501 is projected to the smart speaker 503.

As shown in FIG. 12, the application scenario may include a PC 601, a mobile phone 602, and Vision 603.

The PC 601 is playing media data. For example, the data includes at least one of the following: video data, audio data, document data, or picture data. For example, as shown in a leftmost diagram in FIG. 12, the PC 601 is playing a PPT file. In this case, the PC 601 communicates with another device by using a Wi-Fi network technology or a BT network technology.

The mobile phone 602 may display a desktop of the mobile phone 602. For example, refer to a diagram in the middle of FIG. 12.

Vision 603 may display a desktop of Vision 603. For example, refer to a rightmost diagram in FIG. 12. In this case, Vision 603 communicates with another device by using a Wi-Fi network technology or an NFC technology.

Figure 13:
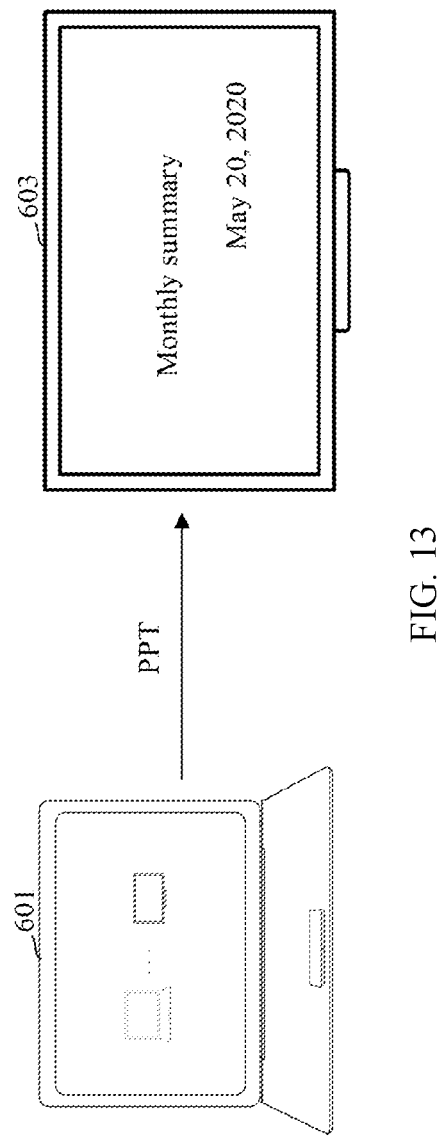
FIG. 13 is a schematic diagram of an example of data sharing between a PC and Vision according to an embodiment of this application.

When a user needs to project media data being played on the PC 601 to Vision 603, because a wireless communication module of the PC 601 may provide a Wi-Fi network communication technology and/or a BT communication technology and a wireless communication module of Vision 603 may also provide a Wi-Fi network communication technology and/or a BT communication technology, network connection modes used by the PC 601 and Vision 603 are the same, and therefore a Wi-Fi or BT network connection may be directly established between the PC 601 and Vision 603, and the PC 601 projects, through the Wi-Fi or BT network, the media data being played on the PC 601 to Vision 603. FIG. 13 is a schematic diagram of a process in which the PC 601 directly projects the media data being played on the PC 601 to Vision 603.

First, the mobile phone 602 sends network connection information of the PC 601 to Vision 603, or the mobile phone 602 sends network connection information of Vision 603 to the PC 601, to implement a network connection between Vision 603 and the PC 601. Then the PC 601 dynamically encodes the media data being played on the PC 601, and dynamically projects, to Vision 603 through the established Wi-Fi or BT network connection, encoded media data being played on the PC 601.

Optionally, in a process in which the PC 601 dynamically forwards the encoded media data to Vision 603, information indicating that the data is being transmitted may be displayed on the PC 601. For example, a dynamic image indicating that the media data is being transmitted by the PC 601 to Vision 603 may be displayed on the PC 601. For example, refer to an interface displayed on the PC 601 in FIG. 12.

For example, as shown in FIG. 13, the PC 601 is playing the PPT file. The PC 601 encodes the PPT file, and sends an encoded PPT file to Vision 603. Vision 603 decodes the PPT file, and synchronously plays the PPT file being played on the PC 601, so that the data being played on the PC 601 is projected to Vision 603.

With reference to FIG. 3 to FIG. 8, a data sharing method provided in embodiments of this application may be applied to a system including a primary electronic device and a relay electronic device, or may be applied to a system including a relay electronic device and a secondary electronic device, or may be applied to a system including a primary electronic device, a relay electronic device, and a secondary electronic device. The primary electronic device and the secondary electronic device are electronic devices with low mobility, and the relay electronic device is an electronic device with high mobility. The relay electronic device may serve as a relay device between the primary electronic device and the secondary electronic device, and store, to the secondary electronic device according to a user requirement, some or all data stored on the primary electronic device, to implement data exchange between the primary electronic device and the secondary electronic device. This improves user experience.

For example, as shown in FIG. 3, the primary electronic device is Vision 301, the relay electronic device is the mobile phone 302, and the secondary electronic device is the smart speaker 303. For another example, as shown in FIG. 6, the primary electronic device is the PC 401, the relay electronic device is the mobile phone 402, and the secondary electronic device is Vision 403.

Figure 14A:
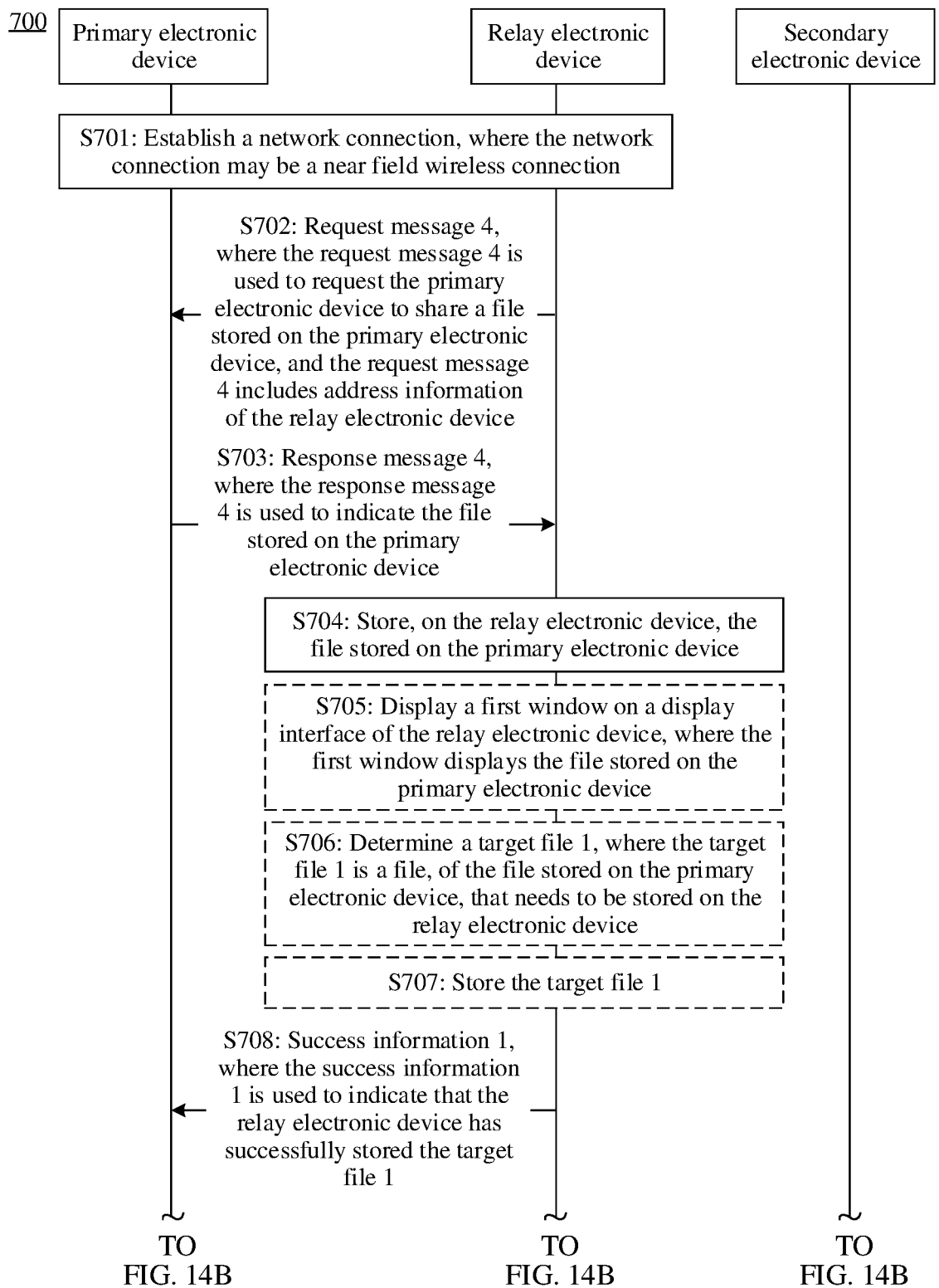
FIG. 14A and FIG. 14B are a schematic flowchart of an example of a data sharing method according to an embodiment of this application.
Figure 14B:
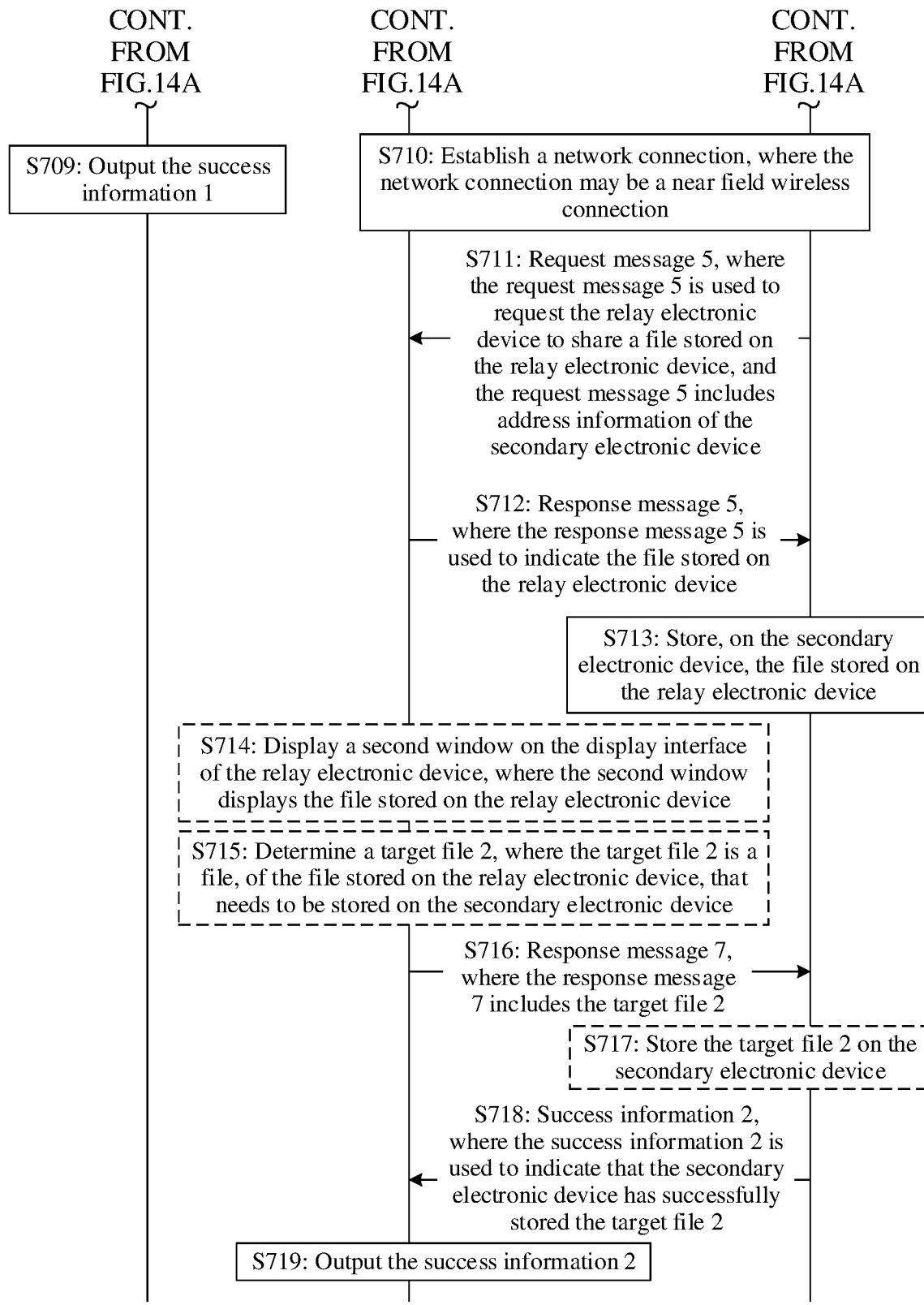

FIG. 14A and FIG. 14B are a schematic flowchart of a data sharing method 700 according to an embodiment of this application.

When a user needs to share a file stored on a primary electronic device to a secondary electronic device, first, the user needs to share the file stored on the primary electronic device to a relay electronic device. For specific steps, refer to the following S701 to S709. Then the file that is stored on the primary electronic device and that is stored on the relay electronic device is shared to the secondary electronic device. For specific steps, refer to the following S710 to S717.

S701: A user places a relay electronic device close to a primary electronic device, and establishes a near field wireless connection between the relay electronic device and the primary electronic device, where the near field wireless connection is used to transmit data.

For example, the near field wireless connection includes a BT connection, a Wi-Fi connection, an NFC connection, or a ZigBee (ZigBee) connection.

Before the user establishes the near field wireless connection between the relay electronic device and the primary electronic device, the user needs to determine that a near field transmission function on the relay electronic device or the primary electronic device is in an enabled state.

For example, the user may turn on at least one of a BT switch, a Wi-Fi switch, or an NFC switch on the primary electronic device.

For example, the user may turn on at least one of a BT switch, a Wi-Fi switch, or an NFC switch on the relay electronic device.

A manner of establishing, by the user, the near field wireless connection between the relay electronic device and the primary electronic device is not limited in this application.

For example, the user places the relay electronic device close to the primary electronic device, turns on the BT switch on each of the relay electronic device and the primary electronic device, and manually performs BT pairing and connection between the relay electronic device and the primary electronic device, to complete the near field wireless connection between the relay electronic device and the primary electronic device.

For example, as shown in FIG. 3, BT pairing and connection are performed between the mobile phone 302 and Vision 301, to complete a near field wireless connection between the mobile phone 302 and Vision 301.

For example, the user enables an NFC function of the relay electronic device and an NFC function of the primary electronic device, and places an NFC sensing area of the relay electronic device close to an NFC sensing area of the primary electronic device, to complete the near field wireless connection between the relay electronic device and the primary electronic device.

For example, as shown in FIG. 4, the NFC sensing area of the mobile phone 302 is placed close to the NFC sensing area 3041 of the remote control 304, to complete a near field wireless connection between the mobile phone 302 and Vision 301.

For another example, as shown in FIG. 7, the NFC sensing area of the mobile phone 402 is placed close to the NFC sensing area 4011 of the PC 401, to complete a near field wireless connection between the mobile phone 302 and the PC 401.

S702: The primary electronic device receives a request message 4 sent by the relay electronic device, where the request message 4 is used to request the primary electronic device to share a file stored on the primary electronic device, and the request message 4 includes address information of the relay electronic device. Correspondingly, the relay electronic device sends the request message 4 to the primary electronic device.

The address information of the relay electronic device may include a media access control (media access control, MAC) address of the relay electronic device and/or an internet protocol (internet protocol, IP) address of the relay electronic device.

For example, the file stored on the primary electronic device may include at least one of the following: a video file, an audio file, a document file, a picture file, or the like.

S703: The relay electronic device receives a response message 4 sent by the primary electronic device, where the response message 4 is used to indicate the file stored on the primary electronic device. Correspondingly, the primary electronic device sends the response message 4 to the relay electronic device.

Specifically, the primary electronic device sends, to the relay electronic device based on the address information of the relay electronic device in the request message 4, the file that is stored on the primary electronic device and that is requested by the request message 4.

Optionally, the response message 4 may further carry a device name of the primary electronic device.

In some embodiments, the response message 4 includes the file stored on the primary electronic device.

In some other embodiments, the response message 4 includes an identifier of the file stored on the primary electronic device.

Optionally, the identifier of the file stored on the primary electronic device may include a type identifier of each file and/or an identifier of each file. For example, the type identifier of the file may be a video file, an audio file, a document file, or a picture file. The identifier of the file may be a name of the file.

In still some other embodiments, the response message 4 includes the file stored on the primary electronic device and a type identifier of each file stored on the primary electronic device.

When the response message 4 includes the file stored on the primary electronic device, the relay electronic device performs S704.

S704: The relay electronic device stores, on the relay electronic device based on the response message 4, the file stored on the primary electronic device.

Optionally, the relay electronic device may correspondingly store the file that is stored on the primary electronic device and the device name of the primary electronic device that is carried in the response message 4.

Optionally, S704 may be alternatively replaced with S705 and S706.

S705: The relay electronic device displays a window 1 on a display interface of the relay electronic device, where the window 1 displays the file stored on the primary electronic device.

For example, the window 1 may be the window 3021 shown in FIG. 5. For another example, the window 1 may be the window 4021 shown in FIG. 8.

In some embodiments, the window 1 may display the file stored on the primary electronic device.

Optionally, the window 1 may display, by category, the file stored on the primary electronic device. For example, a video file, an audio file, a document file, or a picture file is displayed by category.

In some other embodiments, the window 1 may display the identifier of the file stored on the primary electronic device.

Optionally, the window 1 may display, by category, the identifier of the file stored on the primary electronic device.

For example, a name of a video file, a name of an audio file, a name of a document file, or a name of a picture file is displayed by category.

For example, as shown in (b) in FIG. 5, an audio file, a video file, or a picture file is displayed by category.

In still some other embodiments, the window 1 may display the file stored on the primary electronic device and the identifier of the file.

Optionally, the window 1 may display, by category, the file stored on the primary electronic device.

For example, as shown in (d) in FIG. 8, an audio file, a video file, or an image file is displayed by category. In addition, a name of the file (for example, "Audio A.wav") is also displayed.

Optionally, the window 1 may further display the name of the primary electronic device.

For example, as shown in (b) in FIG. 5, the name of the primary electronic device may be Huawei Vision or Huawei Watch. For another example, as shown in (b) in FIG. 8, the name of the primary electronic device may be Huawei PC.

Optionally, the window 1 may further include a copy control configured to perform local storage, for example, the copy control shown in (b) in FIG. 5, or for another example, the copy control shown in (b) in FIG. 8.

S706: Determine a target file 1, where the target file 1 is a file, of the file stored on the primary electronic device, that needs to be stored on the relay electronic device.

The target file 1 is a file stored on the primary electronic device and/or the relay electronic device.

Optionally, the target file 1 may be some or all of files stored on the primary electronic device and/or the relay electronic device.

In some embodiments, the user may tap the file that is in the window 1 in S705 and that needs to be stored on the relay electronic device, so that the relay electronic device can determine the target file 1 when detecting the operation of tapping, by the user, the file that is in the window 1 in S705 and that needs to be stored on the relay electronic device.

For example, as shown in (e) in FIG. 5, the mobile phone detects an operation of selecting, by the user, audio on the Huawei Vision that has been stored on the mobile phone, and determines that the target file 1 is an audio file on the Huawei Vision. For another example, as shown in (d) in FIG. 8, the mobile phone detects an operation of selecting, by the user, the audio "Audio A" and the second video that are stored on the Huawei PC, and determines that the target file 1 is an audio file "Audio A" and the second video file that are stored on the Huawei PC.

In some other embodiments, the user may input, through speech, the file that needs to be stored on the relay electronic device, so that the relay electronic device determines the target file 1 by using a speech recognition function.

In still some other embodiments, the user may touch and hold the media file that needs to be stored on the relay electronic device, so that the relay electronic device can determine the target file 1 when detecting the operation of touching and holding the media file by the user.

Optionally, in S702, if the response message 4 received by the relay electronic device does not include the file stored on the primary electronic device, the relay electronic device further needs to perform S7061 and S7062 after S706 and before S707.

S7061: The relay electronic device sends a request message 6 to the primary electronic device, where the request message 6 is used to request the primary electronic device to share the target file 1, and the request message 6 includes an identifier of the target file 1. Correspondingly, the primary electronic device receives the request message 6 sent by the relay electronic device.

S7062: The relay electronic device receives a response message 6 sent by the primary electronic device, where the response message 6 includes the target file 1.

S707: The relay electronic device stores the target file 1.

In some embodiments, the user may tap the copy control, so that the relay electronic device detects the operation of tapping the copy control by the user, and stores the target file 1 on the relay electronic device.

In some other embodiments, the user may input a save command through speech, so that the relay electronic device stores the target file 1 on the relay electronic device by using a speech recognition function.

In still some other embodiments, the user touches and holds the media file that needs to be stored on the relay electronic device, so that the relay electronic device detects the operation of touching and holding the media file by the user, and stores the target file 1 on the relay electronic device.

Optionally, the relay electronic device may further perform S708, and the primary electronic device may further perform S709.

S708: The relay electronic device sends success information 1 to the primary electronic device, where the success information 1 is used to indicate that the relay electronic device has successfully stored the target file 1. Correspondingly, the primary electronic device receives the success information 1 sent by the relay electronic device.

S709: The primary electronic device outputs the success information 1.

In some embodiments, the primary electronic device displays, on a display interface of the primary electronic device, content indicated in the success information 1.

In some other embodiments, the primary electronic device plays the content indicated in the success information 1.

S701 to S709 mainly describe a specific implementation process in which the relay electronic device stores, on the relay electronic device, some or all files stored on the primary electronic device.

In some embodiments, the relay electronic device may further share, to a secondary electronic device, some or all files, stored on the primary electronic device, that have been stored. The following steps S710 to S719 mainly describe a specific implementation process in which the relay electronic device shares, to the secondary electronic device, some or all files, stored on the primary electronic device, that have been stored.

S710: The user places the relay electronic device close to the secondary electronic device, and establishes a near field wireless connection between the relay electronic device and the secondary electronic device, where the near field wireless connection is used to transmit data.

A manner of establishing, by the user, the near field wireless connection between the relay electronic device and the secondary electronic device is not limited in this application.

For example, for an example of establishing, by the relay electronic device, the near field wireless connection to the secondary electronic device, refer to the descriptions of the example of establishing, by the relay electronic device, the near field wireless connection to the secondary electronic device in S701, except that the primary electronic device in S701 needs to be changed to the secondary electronic device. Details are not described herein again.

For example, as shown in FIG. 3, BT pairing and connection are performed between the mobile phone 302 and the smart speaker 303, to complete a near field wireless connection between the mobile phone 302 and the smart speaker 303.

For example, as shown in FIG. 4, the NFC sensing area of the mobile phone 302 is placed close to the NFC sensing area 3031 of the smart speaker 303, to complete a near field wireless connection between the mobile phone 302 and the smart speaker 303.

For another example, as shown in FIG. 7, the NFC sensing area of the mobile phone 402 is placed close to the NFC sensing area 4041 of the remote control 404, to complete a near field wireless connection between the mobile phone 302 and Vision 403.

S711: The relay electronic device receives a request message 5 sent by the secondary electronic device, where the request message 5 is used to request the relay electronic device to share a file stored on the relay electronic device, and the request message 5 includes address information of the secondary electronic device. Correspondingly, the secondary electronic device sends the request message 5 to the relay electronic device.

The address information of the secondary electronic device may include a MAC address of the secondary electronic device and/or an IP address of the secondary electronic device.

The file stored on the relay electronic device includes a file stored on the relay electronic device when the user uses the relay electronic device, and/or a file that is stored on another electronic device and that is stored on the relay electronic device, for example, the target file 1 that is stored on the primary electronic device and that is stored by the relay electronic device in S704 or S706.

S712: The relay electronic device sends a response message 5 to the secondary electronic device, where the response message 5 is used to indicate the file stored on the relay electronic device. Correspondingly, the secondary electronic device receives the response message 5 sent by the relay electronic device.

Specifically, the relay electronic device sends, to the secondary electronic device based on the address information of the secondary electronic device in the request message 5, the file that is stored on the relay electronic device and that is requested by the request message 5.

Optionally, the response message 5 may further carry a device name of a device source that generates the file.

In some embodiments, the response message 5 includes the file stored on the relay electronic device.

In some other embodiments, the response message 5 includes an identifier of the file stored on the relay electronic device.

Optionally, the identifier of the file stored on the relay electronic device may include a type identifier of each file and/or an identifier of each file.

In still some other embodiments, the response message 5 includes the file stored on the relay electronic device and a type identifier of each file stored on the relay electronic device.

When the response message 5 includes the file stored on the relay electronic device, the secondary electronic device performs S713.

S713: The secondary electronic device stores, on the secondary electronic device based on the response message 5, the file stored on the relay electronic device.

Optionally, the secondary electronic device may correspondingly store the file that is stored on the relay electronic device and the device name, carried in the response message 5, of the device source that generates the file.

Optionally, S712 and S713 may be alternatively replaced with steps S714 to S717.

S714: The relay electronic device displays a window 2 on the display interface of the relay electronic device, where the window 2 displays the file stored on the relay electronic device.

For example, the window 2 may be the window 3022 shown in FIG. 5. For another example, the window 2 may be the window 4022 shown in FIG. 8.

In some embodiments, the window 2 may display the file stored on the relay electronic device.

Optionally, the window 2 may display, by category, the file stored on the relay electronic device. For example, a video file, an audio file, a document file, or a picture file is displayed by category.

In some other embodiments, the window 2 may display the identifier of the file stored on the relay electronic device.

Optionally, the window 2 may display, by category, the identifier of the file stored on the relay electronic device.

For example, a name of a video file, a name of an audio file, a name of a document file, or a name of a picture file is displayed by category.

For example, as shown in (d) in FIG. 5, an audio file is displayed by category.

In still some other embodiments, the window 2 may display the file stored on the relay electronic device and the identifier of the file.

Optionally, the window 2 may display, by category, the file stored on the relay electronic device.

Optionally, the window 2 may further display the device name of the device source that generates the file.

For example, as shown in (d) in FIG. 5, the device name of the device source that generates the file may be Huawei Vision. For another example, as shown in (e) in FIG. 8, the device name of the device source that generates the file may be Huawei PC.

Optionally, the window 2 may further include a paste control configured to perform sending to another electronic device, for example, the paste control shown in (d) in FIG. 5, or for another example, the paste control shown in (e) in FIG. 8.

S715: Determine a target file 2, where the target file 2 is data, of data stored on the relay electronic device, that needs to be stored on the secondary electronic device.

The target file 2 may be some or all of the target file 1.

In some embodiments, the user may tap the file that is in the window 2 in S714 and that needs to be stored on the secondary electronic device, so that the relay electronic device can determine the target file 2 when detecting the operation of tapping, by the user, the file that is in the window 2 in S714 and that needs to be stored on the secondary electronic device.

For example, as shown in (e) in FIG. 5, when detecting an operation of selecting, by the user, audio on the Huawei Vision that has been stored on the mobile phone, the mobile phone can determine that the target file 2 is an audio file on the Huawei Vision. For another example, as shown in (f) in FIG. 8, when detecting an operation of selecting, by the user, the audio "Audio A" and the second video that are stored on the Huawei PC, the mobile phone can determine that the target file 2 is an audio file "Audio A" and the second video file that are stored on the Huawei PC.

In some other embodiments, the user may input, through speech, the file that needs to be stored on the secondary electronic device, so that the relay electronic device can determine the target file 2 by using a speech recognition function.

In still some other embodiments, the user may touch and hold the media file that needs to be stored on the secondary electronic device, so that the relay electronic device can determine the target file 2 when detecting the operation of touching and holding the media file by the user.

S716: The relay electronic device sends a response message 7 to the secondary electronic device, where the response message 7 includes the target file 2. Correspondingly, the secondary electronic device receives the response message 7 sent by the relay electronic device.

In some embodiments, the user may tap the paste control, so that the relay electronic device detects the operation of tapping the paste control by the user, adds the target file 2 to the response message 7, and sends the response message 7 to the secondary electronic device.

In some other embodiments, the user may input a share command through speech, so that the relay electronic device adds the target file 2 to the response message 7 and sends the response message 7 to the secondary electronic device by using a speech recognition function.

In still some other embodiments, the user may touch and hold and swipe, along a first direction, the media file that needs to be stored on the secondary electronic device, so that the relay electronic device detects the operation of touching and holding the media file and swiping the media file along the first direction by the user, adds the target file 2 to the response message 7, and sends the response message 7 to the secondary electronic device.

S717: The secondary electronic device stores the target file 2 on the secondary electronic device based on the response message 7.

Optionally, the relay electronic device may further perform S718 and S719.

S718: The relay electronic device receives success information 2 sent by the secondary electronic device, where the success information 2 is used to indicate that the secondary electronic device has successfully stored the target file 2. Correspondingly, the secondary electronic device sends the success information 2 to the relay electronic device.

S719: The relay electronic device outputs the success information 2.

In some embodiments, the relay electronic device displays, on the display interface of the relay electronic device, content indicated in the success information 2.

In some other embodiments, the relay electronic device plays the content indicated in the success information 2.

With reference to FIG. 9 to FIG. 13, embodiments of this application provide another data sharing method. The data sharing method may be applied to a system including a primary electronic device, a relay electronic device, and a secondary electronic device. The primary electronic device and the secondary electronic device are electronic devices with low mobility, and the relay electronic device is an electronic device with high mobility. The relay electronic device may serve as a medium or a relay device between the primary electronic device and the secondary electronic device, to perform screen projection and/or sound projection, to the secondary electronic device, for data being played on the primary electronic device, so that screen projection and/or sound projection between two electronic devices with low mobility can be conveniently and quickly implemented. This implements collaboration between a plurality of electronic devices with low mobility, and improves user experience.

For example, as shown in FIG. 9, the primary electronic device is Vision 501, the relay electronic device is the mobile phone 502, and the secondary electronic device is the smart speaker 503. For another example, as shown in FIG. 12, the primary electronic device is the PC 601, the relay electronic device is the mobile phone 602, and the secondary electronic device is Vision 603.

Figure 15A:
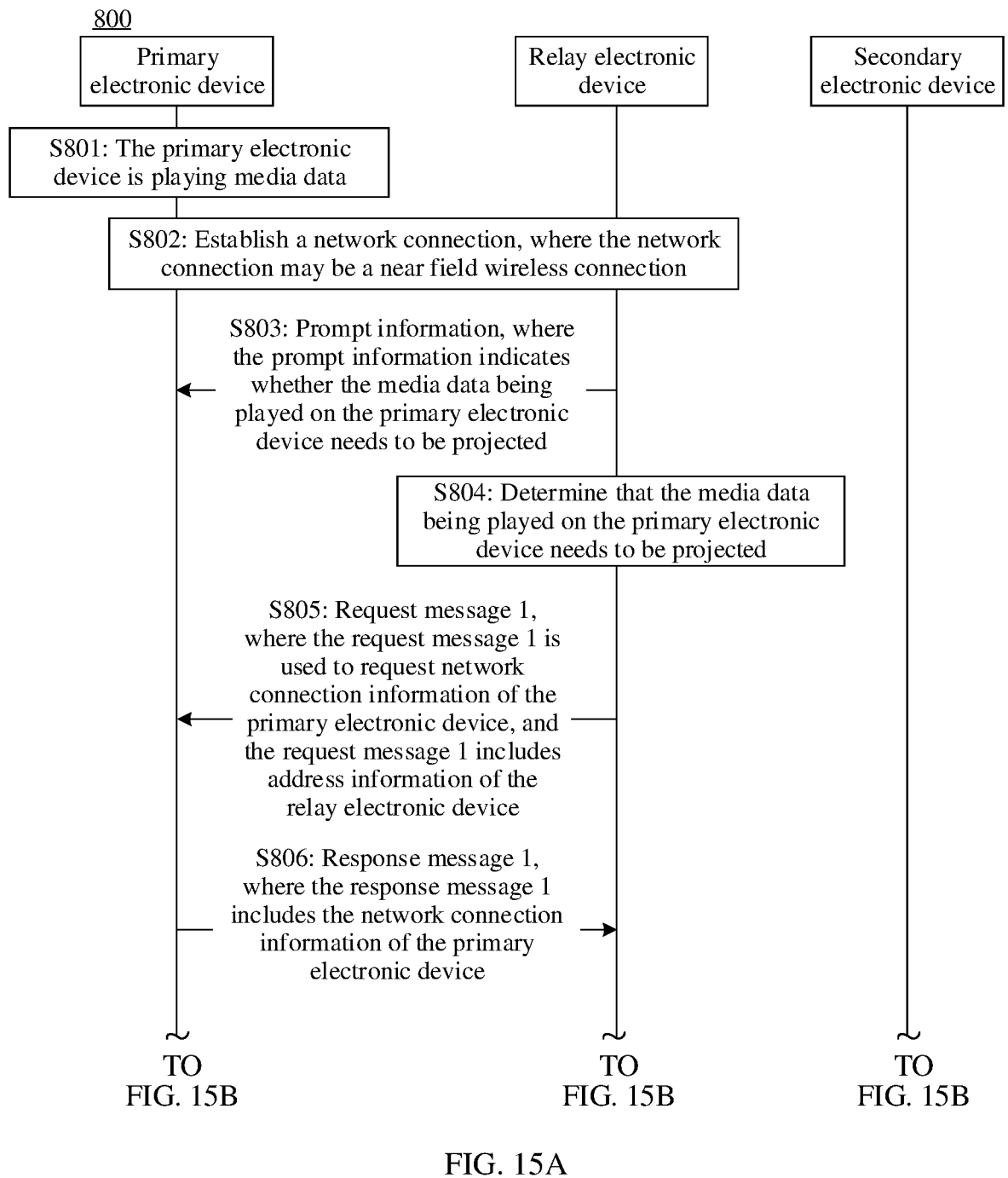
FIG. 15A and FIG. 15B are a schematic flowchart of another example of a data sharing method according to an embodiment of this application.
Figure 15B:
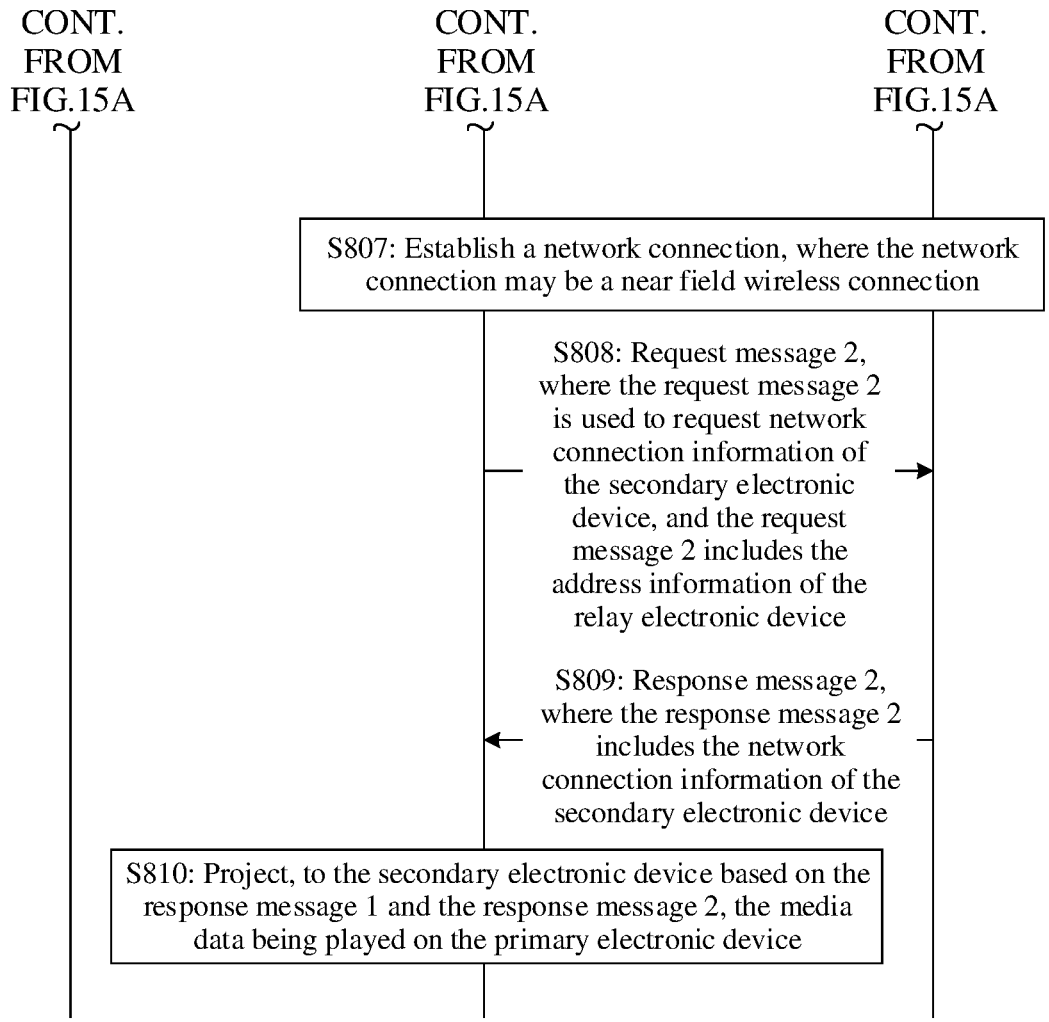

FIG. 15A and FIG. 15B are a schematic flowchart of another data sharing method 800 according to an embodiment of this application. As shown in FIG. 15A and FIG. 15B, the method includes the following steps.

S801: A primary electronic device is playing media data.

S802: A user places a relay electronic device close to the primary electronic device, and establishes a near field wireless connection between the relay electronic device and the primary electronic device.

For an example of establishing, by the relay electronic device, the near field wireless connection to the primary electronic device, refer to the descriptions of the example of establishing, by the relay electronic device, the near field wireless connection to the secondary electronic device in S701. Details are not described herein again. S803: The primary electronic device sends prompt information to the relay electronic device through the near field wireless connection established in S802, where the prompt information is used to indicate whether the media data being played on the primary electronic device needs to be projected.

In a possible implementation, the relay electronic device may display the prompt information on a display interface of the relay electronic device.

In another possible implementation, the relay electronic device may play the prompt information through speech.

S804: The relay electronic device determines that the media data being played on the primary electronic device needs to be projected.

In a possible implementation, the user may input, by using the display interface of the relay electronic device, that the user needs to project the media data being played on the primary electronic device.

In another implementation, the user may input, by using a speech assistant, that the user needs to project the media data being played on the primary electronic device.

Network transmission modules included in all electronic devices are not necessarily the same. For example, some electronic devices are provided with a Wi-Fi module, and some electronic devices are not provided with a Wi-Fi module. For another example, some electronic devices are provided with a BT module, and some electronic devices are not provided with a BT module. Therefore, channels that can be used by electronic devices to perform network transmission may be different.

Therefore, the relay electronic device needs to first obtain a type of a network transmission channel that can be used by the primary electronic device for transmission. For details, refer to S805 and S806.

S805: The relay electronic device sends a request message 1 to the primary electronic device through the near field wireless connection established in S802, where the request message 1 is used to request network connection information of the primary electronic device, and the request message 1 includes address information of the relay electronic device. Correspondingly, the primary electronic device receives the request message 1 sent by the relay electronic device.

S806: The relay electronic device receives, through the near field wireless connection established in S802, a response message 1 sent by the primary electronic device, where the response message 1 includes the network connection information of the primary electronic device. Correspondingly, the primary electronic device sends the response message 1 to the relay electronic device.

Specifically, the primary electronic device sends the response message 1 to the relay electronic device based on the address information of the relay electronic device in the request message 1.

In some embodiments, the network connection information of the primary electronic device may be wireless fidelity (wireless fidelity, Wi-Fi) network connection information of the primary electronic device. For example, the Wi-Fi network connection information of the primary electronic device includes a MAC address and/or an IP address of the primary electronic device.

In some other embodiments, the network connection information of the primary electronic device may be BT pairing information of the primary electronic device. For example, the BT pairing information of the primary electronic device includes a BT identifier of the primary electronic device and a pairing key corresponding to the BT identifier of the primary electronic device.

In still some other embodiments, the network connection information of the primary electronic device may be Wi-Fi network connection and BT pairing information of the primary electronic device.

Optionally, the response message 1 may further include a device name of the primary electronic device.

Then the relay electronic device further needs to obtain a type of a network transmission channel that can be used by a secondary electronic device for transmission. For details, refer to S807 and S809.

S807: The user places the relay electronic device close to the secondary electronic device, and establishes a near field wireless connection between the relay electronic device and the secondary electronic device.

For example, for an example of establishing, by the relay electronic device, the near field wireless connection to the secondary electronic device, refer to the descriptions of the example of establishing, by the relay electronic device, the near field wireless connection to the secondary electronic device in S701, except that the primary electronic device in S701 needs to be changed to the secondary electronic device. Details are not described herein again.

S808: The relay electronic device sends a request message 2 to the secondary electronic device through the near field wireless connection established in S807, where the request message 2 is used to request network connection information of the secondary electronic device, and the request message 2 includes the address information of the relay electronic device. Correspondingly, the secondary electronic device receives the request message 2 sent by the relay electronic device.

S809: The relay electronic device receives, through the near field wireless connection established in S807, a response message 2 sent by the secondary electronic device, where the response message 2 includes the network connection information of the secondary electronic device. Correspondingly, the secondary electronic device sends the response message 2 to the relay electronic device.

Specifically, the secondary electronic device sends the response message 2 to the relay electronic device based on the address information of the relay electronic device in the request message 2.

In some embodiments, the network connection information of the secondary electronic device may be Wi-Fi network connection information of the secondary electronic device. For example, the Wi-Fi network connection information of the secondary electronic device includes a MAC address and/or an IP address of the secondary electronic device.

In some other embodiments, the network connection information of the secondary electronic device may be BT pairing information of the secondary electronic device. For example, the BT pairing information of the secondary electronic device includes a BT identifier of the secondary electronic device and a pairing key corresponding to the BT identifier of the secondary electronic device.

In still some other embodiments, the network connection information of the secondary electronic device may be Wi-Fi network connection and BT pairing information of the secondary electronic device. Optionally, the response message 2 may further include a device name of the secondary electronic device.

S810: The relay electronic device projects, to the secondary electronic device based on the response message 1 and the response message 2, the media data being played on the primary electronic device.

The projecting the media data being played on the primary electronic device to the secondary electronic device may be classified into the following two data sharing policies.

Policy 1: A network connection is established between the primary electronic device and the secondary electronic device by using the relay electronic device, and the media data being played on the primary electronic device is projected to the secondary electronic device through a network established between the primary electronic device and the relay electronic device.

For example, as shown in FIG. 13, the user directly establishes a Wi-Fi or BT network connection between the PC 601 and Vision 603. In addition, the PC 601 projects, to Vision 603 through the established Wi-Fi or BT network, the PPT file being played on the PC 601.

Policy 2: Data being played on the primary electronic device is first projected to the relay electronic device, and then the relay electronic device projects, to the secondary electronic device, the data being played on the primary electronic device.

For example, as shown in FIG. 10, first, the user establishes a Wi-Fi network connection between the mobile phone 502 and Vision 501, and Vision 501 sends, to the mobile phone 502 through the established Wi-Fi network, the video A being played on Vision 501. Then the user establishes a BT network connection between the mobile phone 502 and the smart speaker 503, and the mobile phone 502 forwards, to the smart speaker 503 through the established BT network, the video A being played on Vision 501. In this way, the video A being played on Vision 501 is projected to the smart speaker 503.

Manner 1 and Manner 2 are used as examples below to separately describe how the relay electronic device determines, based on the response message 1 and the response message 2, a policy for sharing data between the primary electronic device and the secondary electronic device.

Manner 1: The relay electronic device may first determine a protocol type between the primary electronic device and the secondary electronic device based on the response message 1 and the response message 2, and then determine a data sharing policy between the primary electronic device and the secondary electronic device based on the protocol type between the primary electronic device and the secondary electronic device.

Specifically, first, the relay electronic device determines the protocol type between the primary electronic device and the secondary electronic device based on the response message 1 and the response message 2, where the protocol type includes a heterogeneous protocol type and a homogeneous protocol type. The heterogeneous protocol type is that a network connection mode of the primary electronic device is different from a network connection mode of the secondary electronic device. The homogeneous protocol type is that a network connection mode of the primary electronic device is the same as a network connection mode of the secondary electronic device. For example, as shown in Table 1, when both the network connection mode of the primary electronic device and the network connection mode of the secondary electronic device are a Wi-Fi network connection, or when both the network connection mode of the primary electronic device and the network connection mode of the secondary electronic device are a BT network connection, the protocol type between the primary electronic device and the secondary electronic device is a homogeneous protocol type. When the network connection mode of the primary electronic device is a Wi-Fi network connection and the network connection mode of the secondary electronic device is a BT network connection, or when the network connection mode of the primary electronic device is a BT network connection and the network connection mode of the secondary electronic device is a Wi-Fi network connection, the protocol type between the primary electronic device and the secondary electronic device is a heterogeneous protocol type. Then the relay electronic device determines, based on the protocol type between the primary electronic device and the secondary electronic device, a policy for sharing data between the primary electronic device and the secondary electronic device.

TABLE 1

| Network connection mode | | | | |
|---|---|---|---|---|
| Primary electronic device | Secondary electronic device | Protocol type | Data sharing policy | |
| Wi-Fi | Wi-Fi | Homogeneous protocol | The data sharing policy is determined based on a parameter related to measurement information. | The parameter related to measurement information meets a preset condition. Policy 1 |
| BT | BT | | | The parameter related to measurement information does not meet the preset condition. Policy 2 |
| Wi-Fi | BT | Heterogeneous protocol | Policy 2 | |

In an implementation, if the protocol type between the primary electronic device and the secondary electronic device is a homogeneous protocol, the relay electronic device determines that the policy for sharing data between the primary electronic device and the secondary electronic device is the policy 1. In this case, a specific implementation process includes S811 to S820 shown in FIG. 16A and FIG. 16B. If the protocol type between the primary electronic device and the secondary electronic device is a heterogeneous protocol, the relay electronic device determines that the policy for sharing data between the primary electronic device and the secondary electronic device is the policy 2. In this case, a specific implementation process includes S821 to S831 shown in FIG. 17A and FIG. 17B.

With reference to FIG. 16A and FIG. 16B, and FIG. 17A and FIG. 17B, the following separately describes specific implementation processes of projecting data being played on the primary electronic device to the secondary electronic device.

Figure 16A:
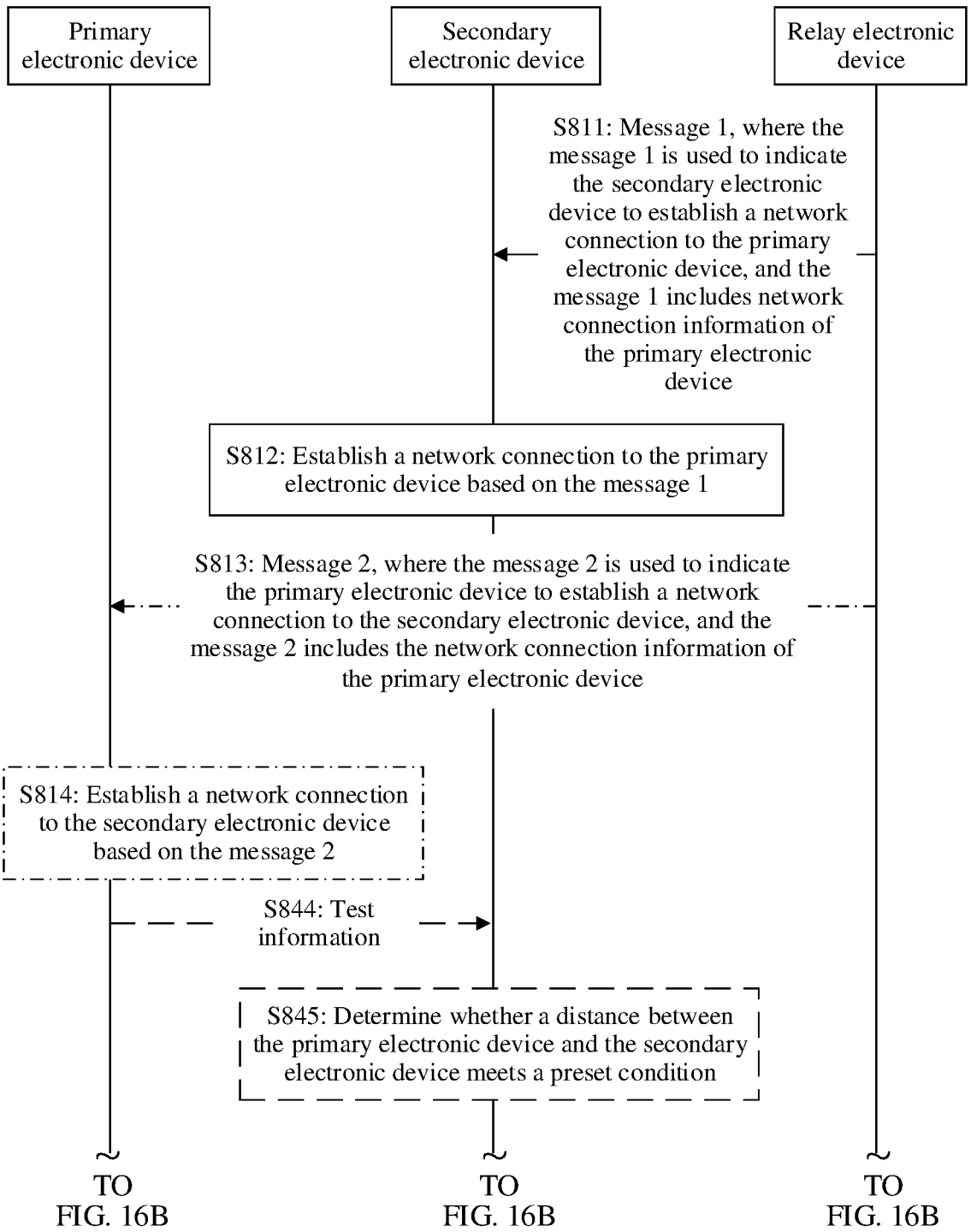
FIG. 16A and FIG. 16B are a schematic flowchart of still another example of a data sharing method according to an embodiment of this application.
Figure 16B:
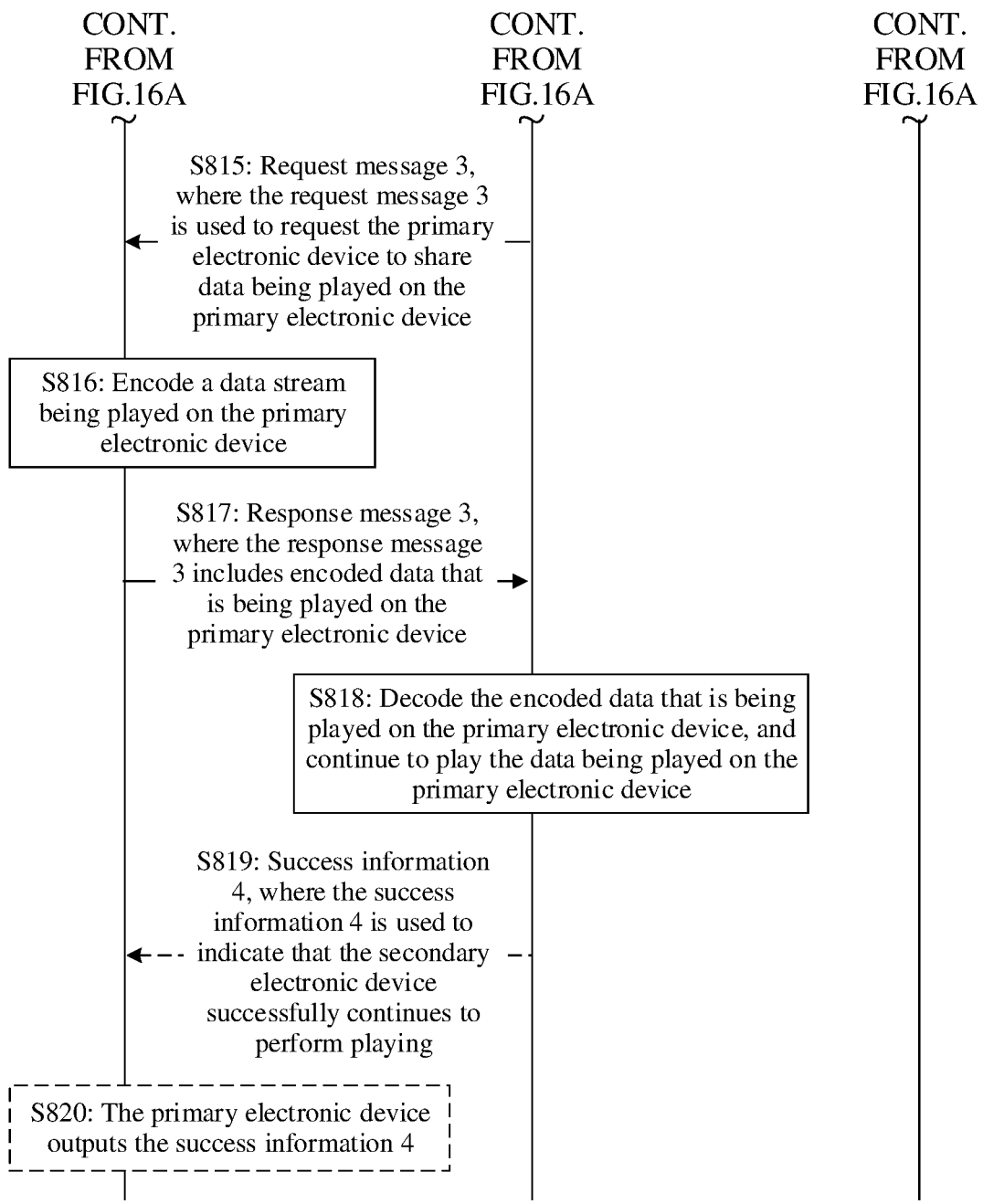

As shown in FIG. 16A and FIG. 16B, a specific implementation process of projecting the data being played on the primary electronic device to the secondary electronic device includes the following steps.

S811: The relay electronic device sends a message 1 to the secondary electronic device, where the message 1 is used to indicate the primary electronic device to establish a network connection to the secondary electronic device. Correspondingly, the secondary electronic device receives the message 1 sent by the relay electronic device.

In some embodiments, the message 1 may be the response message 1.

In some other embodiments, the message 1 may be a message obtained by the relay electronic device by processing the response message 1.

The message 1 includes the network connection information of the primary electronic device.

S812: The secondary electronic device establishes a network connection to the primary electronic device based on the message 1.

When the network connection information of the primary electronic device that is included in the message 1 is the Wi-Fi network connection information of the primary electronic device, the secondary electronic device may establish a Wi-Fi connection to the primary electronic device based on the MAC address and/or the IP address of the primary electronic device.

When the network connection information of the primary electronic device that is included in the message 1 is the BT pairing information of the primary electronic device, the secondary electronic device may establish a BT connection to the primary electronic device based on the BT identifier of the primary electronic device and the pairing key corresponding to the BT identifier of the primary electronic device that are in the BT pairing information of the primary electronic device.

Optionally, S811 and S822 may be alternatively replaced with steps S813 and S814.

S813: The relay electronic device sends a message 2 to the primary electronic device. Correspondingly, the primary electronic device receives the message 2 sent by the relay electronic device.

In some embodiments, the message 2 may be the response message 2.

In some other embodiments, the message 2 may be a message obtained by the relay electronic device by processing the response message 2.

The message 2 includes the network connection information of the secondary electronic device.

S814: The primary electronic device establishes a network connection to the secondary electronic device based on the message 2.

When the network connection information of the secondary electronic device that is included in the message 2 is the Wi-Fi network connection information of the secondary electronic device, the primary electronic device may establish a Wi-Fi connection to the primary electronic device based on the MAC address and/or the IP address of the secondary electronic device.

When the network connection information of the secondary electronic device that is included in the message 2 is the BT pairing information of the secondary electronic device, the primary electronic device may establish a BT connection to the secondary electronic device based on the BT identifier of the secondary electronic device and the pairing key corresponding to the BT identifier of the secondary electronic device that are in the BT pairing information of the secondary electronic device.

After a network connection is established between the primary electronic device and the secondary electronic device, the primary electronic device and the secondary electronic device may transmit data through the established network. Specifically, refer to S815 to S820.

Optionally, S815: The secondary electronic device sends a request message 3 to the primary electronic device, where the request message 3 is used to request the primary electronic device to share the media data being played on the primary electronic device. Correspondingly, the primary electronic device receives the request message 3 sent by the secondary electronic device.

For example, the media data being played on the primary electronic device may include at least one of the following: video data, audio data, document data, or picture data. For example, as shown in FIG. 9, Vision 501 is playing the video A. For another example, as shown in FIG. 10, the PC 601 is playing the PPT file.

S815 may or may not be performed. This is not limited in this application.

S816: The primary electronic device encodes data being played on the primary electronic device.

In this embodiment of this application, encoding data means encoding an identifier of the data, the data, and an address of the data. The identifier of the data may be understood as a name of an application corresponding to the data.

Specifically, the primary electronic device encodes an identifier of the data being played on the primary electronic device, the data being played on the primary electronic device, and an address of the data being played on the primary electronic device, to obtain a data stream being played on the electronic device.

S817: The primary electronic device sends a response message 3 to the secondary electronic device, where the response message 3 includes encoded data that is being played on the primary electronic device. Correspondingly, the secondary electronic device receives the response message 3 sent by the primary electronic device.

S818: The secondary electronic device continues, based on the response message 3, to play the data being played on the primary electronic device.

Specifically, the secondary electronic device may decode the encoded data that is being played on the primary electronic device to obtain the identifier of the data being played on the primary electronic device, the data being played on the primary electronic device, and the address corresponding to the data being played on the primary electronic device, and then the secondary electronic device continues to play the data being played on the primary electronic device, based on the identifier of the data being played on the primary electronic device, the data being played on the electronic device, and the address corresponding to the data being played on the primary electronic device.

The continuing to play the media data being played on the primary electronic device may be that the secondary electronic device displays, on the display of the secondary electronic device, video data, document data, or picture data that is being played on the primary electronic device, for example, as shown in (d) in FIG. 10, Vision 603 plays the PPT file being played on the mobile phone 602; and/or the secondary electronic device plays, by using a speaker of the secondary electronic device, audio data being played on the primary electronic device, or plays audio data corresponding to video data being played on the primary electronic device, for example, as shown in (d) in FIG. 9, the smart speaker 503 continues to play audio corresponding to the video A being played on the mobile phone 502.

S819: The secondary electronic device sends success information 4 to the primary electronic device, where the success information 4 is used to indicate that the secondary electronic device successfully continues to perform playing. Correspondingly, the primary electronic device receives the success information 4 sent by the secondary electronic device.

S820: The primary electronic device outputs the success information 4.

In some embodiments, the primary electronic device displays, on a display interface of the primary electronic device, content indicated in the success information 4.

In some other embodiments, the primary electronic device plays the content indicated in the success information 4.

When screen projection and/or sound projection need to be performed, to the secondary electronic device, for data being played on the primary electronic device, if the protocol type between the primary electronic device and the secondary electronic device is a homogeneous protocol, the network connection information of the primary electronic device or the network connection information of the secondary electronic device is sent to the secondary electronic device or the primary electronic device by using the relay electronic device, to implement a network connection between the primary electronic device and the secondary electronic device. In addition, screen projection and/or sound projection are performed, to the secondary electronic device through the connected network, for the data being played on the primary electronic device, so that screen projection and/or sound projection between the primary electronic device and the secondary electronic device can be conveniently and quickly implemented. This implements collaboration between the primary electronic device and the secondary electronic device, and improves user experience.

Figure 17A:
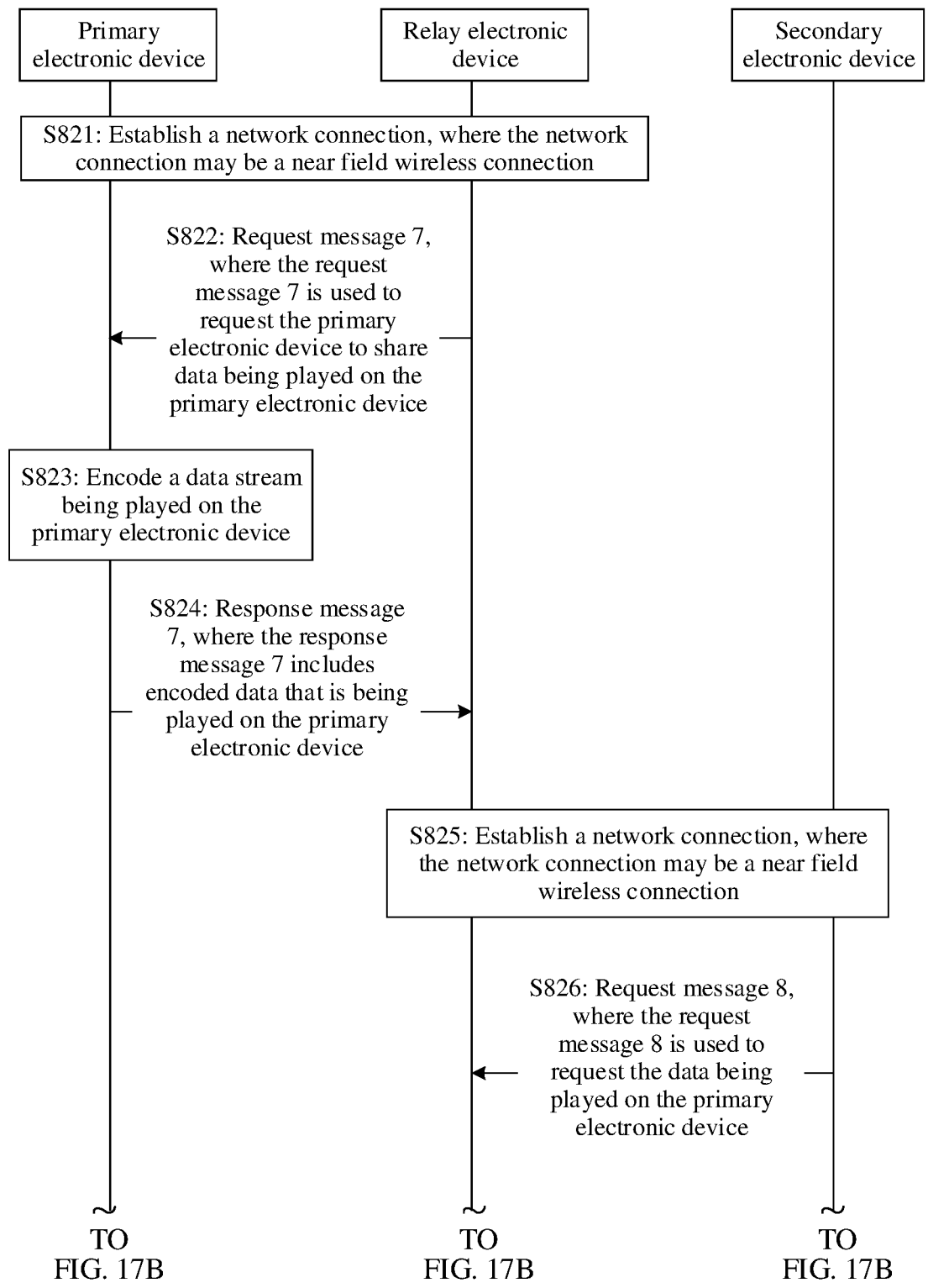
FIG. 17A and FIG. 17B are a schematic flowchart of still another example of a data sharing method according to an embodiment of this application.
Figure 17B:
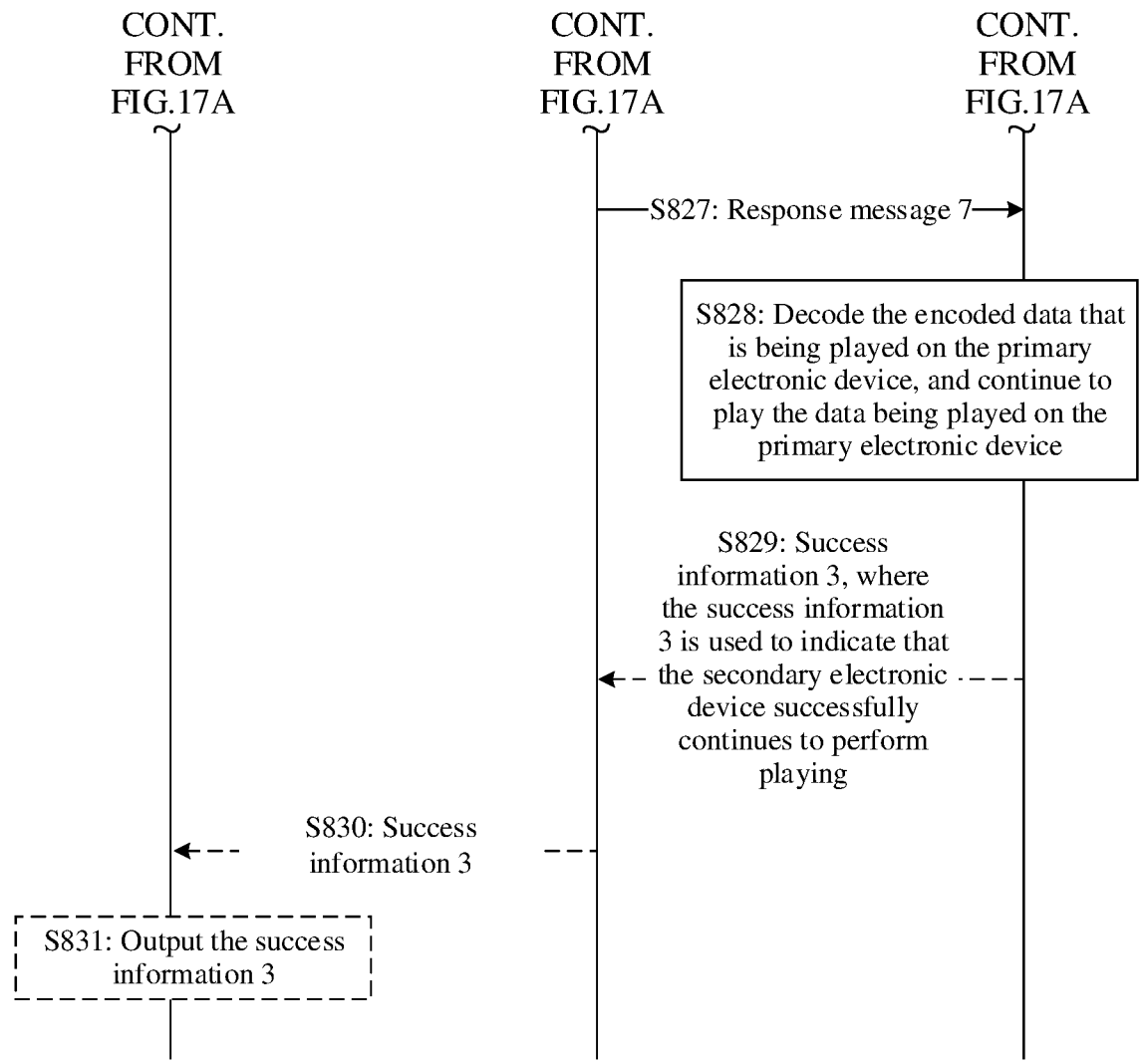

As shown in FIG. 17A and FIG. 17B, a specific implementation process of projecting the data being played on the primary electronic device to the secondary electronic device includes the following steps.

S821: The user places the relay electronic device close to the primary electronic device, and establishes a near field wireless connection between the relay electronic device and the primary electronic device, where the near field wireless connection is used to transmit data.

For an example of establishing, by the relay electronic device, the near field wireless connection to the primary electronic device, refer to the descriptions of the example of establishing, by the relay electronic device, the near field wireless connection to the secondary electronic device in S701. Details are not described herein again.

S822: The primary electronic device receives a request message 7 sent by the relay electronic device, where the request message 7 is used to request the primary electronic device to share the data being played on the primary electronic device. Correspondingly, the relay electronic device sends the request message 7 to the primary electronic device.

S822 may or may not be performed. This is not limited in this application.

S823: The primary electronic device encodes the media data being played on the primary electronic device.

Specifically, the primary electronic device encodes an identifier of the media data being played on the primary electronic device, the media data being played on the primary electronic device, and an address of the media data being played on the primary electronic device, to obtain a media data stream being played on the primary electronic device.

S824: The relay electronic device receives a response message 7 sent by the primary electronic device, where the response message 7 includes encoded data that is being played on the primary electronic device. Correspondingly, the primary electronic device sends the response message 7 to the relay electronic device.

In some embodiments, after the relay electronic device receives the response message 7, the relay electronic device may directly forward the response message 7 to the secondary electronic device, to project the media data being played on the primary electronic device to the secondary electronic device. For details, refer to S825 to S831. In some other embodiments, after the relay electronic device receives the response message 7, the relay electronic device may first project the data being played on the primary electronic device to the relay electronic device, and then project, to the secondary electronic device, the data that is being played on the primary electronic device and that is projected to the relay electronic device. For details, refer to S832 to S843.

S825: The relay electronic device establishes a near field wireless connection to the secondary electronic device, where the near field wireless connection is used to transmit data.

For example, for an example of establishing, by the relay electronic device, the near field wireless connection to the secondary electronic device, refer to the descriptions of the example of establishing, by the relay electronic device, the near field wireless connection to the secondary electronic device in S701, except that the primary electronic device in S701 needs to be changed to the secondary electronic device. Details are not described herein again.

Optionally, S826: The relay electronic device receives a request message 8 sent by the secondary electronic device, where the request message 8 is used to request the relay electronic device to share the media data being played on the primary electronic device. Correspondingly, the secondary electronic device sends the request message 8 to the relay electronic device.

S826 may or may not be performed. This is not limited in this application.

S827: The relay electronic device forwards the response message 7 to the secondary electronic device.

Optionally, the relay electronic device may alternatively process the response message 7, and send a processed response message 7 to the secondary electronic device. The processed response message 7 is used to indicate the media data being played on the primary electronic device.

S828: The secondary electronic device decodes, based on the response message 7, the encoded media data that is being played on the primary electronic device, and continues to play the media data being played on the primary electronic device.

Specifically, the secondary electronic device may decode the encoded media data that is being played on the primary electronic device to obtain the identifier of the media data being played on the primary electronic device, the media data being played on the primary electronic device, and the address corresponding to the media data being played on the primary electronic device, and then the secondary electronic device continues to play the media data being played on the primary electronic device, based on the identifier of the media data being played on the primary electronic device, the media data being played on the primary electronic device, and the address corresponding to the media data being played on the primary electronic device.

S829: The relay electronic device receives success information 3 sent by the secondary electronic device, where the success information 3 is used to indicate that the secondary electronic device successfully continues to perform playing. Correspondingly, the secondary electronic device sends the success information 3 to the relay electronic device.

Optionally, the relay electronic device may output the success information 3.

In some embodiments, the relay electronic device displays, on the display interface of the relay electronic device, content indicated in the success information 3. In some other embodiments, the relay electronic device plays the content indicated in the success information 3.

S830: The relay electronic device forwards the success information 3 to the primary electronic device. Correspondingly, the primary electronic device receives the success information 3 sent by the relay electronic device.

S831: The primary electronic device outputs the success information 3.

In some embodiments, the primary electronic device displays, on a display interface of the primary electronic device, the content indicated in the success information 3. In some other embodiments, the primary electronic device plays the content indicated in the success information 3.

Optionally, S825 to S831 may be alternatively replaced with S832 to S843.

S832: The relay electronic device decodes, based on the response message 7, the encoded media data that is being played on the primary electronic device, and continues to play the media data being played on the primary electronic device.

Specifically, the relay electronic device may decode the encoded media data that is being played on the primary electronic device to obtain the identifier of the media data being played on the primary electronic device, the media data being played on the primary electronic device, and the address corresponding to the media data being played on the primary electronic device, and then the relay electronic device continues to play the media data being played on the primary electronic device, based on the identifier of the media data being played on the primary electronic device, the media data being played on the primary electronic device, and the address corresponding to the media data being played on the primary electronic device.

S833: The relay electronic device sends success information 5 to the primary electronic device, where the success information 5 is used to indicate that the relay electronic device successfully continues to perform playing. Correspondingly, the primary electronic device receives the success information 5 sent by the relay electronic device.

S834: The primary electronic device outputs the success information 5.

In some embodiments, the primary electronic device displays, on a display interface of the primary electronic device, content indicated in the success information 5. In some other embodiments, the primary electronic device plays the content indicated in the success information 5.

S835: The relay electronic device establishes a near field wireless connection to the secondary electronic device, where the near field wireless connection is used to transmit data.

Optionally, S836: The relay electronic device receives a request message 9 sent by the secondary electronic device, where the request message 9 is used to request the relay electronic device to share the media data being played on the relay electronic device. Correspondingly, the secondary electronic device sends the request message 9 to the relay electronic device.

The media data being played on the relay electronic device is media data that is being played on the primary electronic device and that continues to be played on the relay electronic device.

S836 may or may not be performed. This is not limited in this application.

S837: The relay electronic device encodes the media data being played on the relay electronic device.

S838: The relay electronic device sends a response message 9 to the secondary electronic device, where the response message 9 includes the media data being played on the relay electronic device. Correspondingly, the secondary electronic device receives the response message 9 sent by the relay electronic device.

S839: The secondary electronic device decodes, based on the response message 9, the encoded media data that is being played on the relay electronic device, and continues to play the media data being played on the relay electronic device.

For example, as shown in (c) in FIG. 9, the smart speaker 503 plays audio corresponding to the video A being played on the mobile phone 502. For another example, as shown in (c) in FIG. 10, Vision 603 plays the PPT file being played on the mobile phone 602.

S840: The relay electronic device receives success information 6 sent by the secondary electronic device, where the success information 6 is used to indicate that the secondary electronic device successfully continues to perform playing. Correspondingly, the secondary electronic device sends the success information 6 to the relay electronic device.

S841: The relay electronic device outputs the success information 6.

In some embodiments, the relay electronic device displays, on the display interface of the relay electronic device, content indicated in the success information 6. In some other embodiments, the relay electronic device plays the content indicated in the success information 6.

Optionally, S842: The relay electronic device forwards the success information 6 to the primary electronic device. Correspondingly, the primary electronic device receives the success information 6 sent by the relay electronic device.

Optionally, S843: The primary electronic device outputs the success information 6.

In some embodiments, the primary electronic device displays, on the display interface of the primary electronic device, the content indicated in the success information 6. In some other embodiments, the primary electronic device plays the content indicated in the success information 6.

When screen projection and/or sound projection need to be performed, to the secondary electronic device, for data being played on the primary electronic device, if the protocol type between the primary electronic device and the secondary electronic device is a heterogeneous protocol, the data being played on the primary electronic device may be first sent to the relay electronic device, and then the relay electronic device forwards the data being played on the primary electronic device to the secondary electronic device, so that screen projection and/or sound projection can be performed, to the secondary electronic device to continue to perform playing, for the data being played on the primary electronic device. In this way, screen projection and/or sound projection between the primary electronic device and the secondary electronic device can be conveniently and quickly implemented. This implements collaboration between the primary electronic device and the secondary electronic device, and improves user experience.

In another implementation, if the protocol type between the primary electronic device and the secondary electronic device is a homogeneous protocol, further, the relay electronic device needs to determine, based on a distance between the primary electronic device and the secondary electronic device, a policy for sharing data between the primary electronic device and the secondary electronic device.

When the distance between the primary electronic device and the secondary electronic device meets a preset condition, the relay electronic device determines that the policy for sharing data between the primary electronic device and the secondary electronic device is the policy 1. In this case, a specific implementation process includes S811 to S820, S844, and S845 shown in FIG. 16A and FIG. 16B. S844 and S845 are performed after S814, S844 and S845 are performed before S815, and S845 is performed after S844.

When the distance between the primary electronic device and the secondary electronic device does not meet the preset condition, the relay electronic device determines that the policy for sharing data between the primary electronic device and the secondary electronic device is the policy 2. In this case, a specific implementation process includes S811 to S814, S844, and S845 shown in FIG. 16A and FIG. 16B, and S821 to S831 shown in FIG. 17A and FIG. 17B. S844 and S845 are performed after S814, S844 and S845 are performed before S821, and S846 is performed after S844.

As shown in FIG. 16A and FIG. 16B, a specific implementation process of projecting the data being played on the primary electronic device to the secondary electronic device includes the following steps.

For S811 to S814, refer to the foregoing descriptions. Details are not described herein again.

S844: The primary electronic device sends test information to the secondary electronic device.

The test information may not need to carry any content.

S845: The secondary electronic device determines, based on the test information, whether the distance between the primary electronic device and the secondary electronic device meets the preset condition.

Specifically, the secondary electronic device may determine, based on a related parameter of the test information sent by the primary electronic device, whether the distance between the primary electronic device and the secondary electronic device meets the preset condition.

For example, the related parameter of the test information may include signal strength of the test information and/or signal quality of the test information.

The signal strength and the signal quality (a long term evolution (long term evolution, LTE) system is used as an example below for description) in this embodiment of this application may include one or more of the following parameters: a reference signal received power (reference signal receiving power, RSRP), a received signal strength indicator (received signal strength indicator, RSSI), reference signal received quality (reference signal receiving quality, RSRQ), and a signal to interference plus noise ratio (signal to interference plus noise ratio, SINR).

When the related parameter of the test information meets a corresponding preset value, it is determined that the distance between the primary electronic device and the secondary electronic device meets the preset condition. When the related parameter of the test information does not meet the corresponding preset value, it is determined that the distance between the primary electronic device and the secondary electronic device meets the preset condition.

For example, in an embodiment in which the related parameter of the test information includes only strength of the test information, when the strength of the test information is greater than a preset value 1, it may be considered that the distance between the primary electronic device and the secondary electronic device meets the preset condition. When the strength of the test information is less than or equal to the preset value 1, it may be considered that the distance between the primary electronic device and the secondary electronic device does not meet the preset condition.

For example, in an embodiment in which the related parameter of the test information includes only quality of the test information, when the quality of the test information is greater than a preset value 2, it may be considered that the distance between the primary electronic device and the secondary electronic device meets the preset condition. When the quality of the test information is less than or equal to the preset value 2, it may be considered that the distance between the primary electronic device and the secondary electronic device does not meet the preset condition.

For example, in an embodiment in which the related parameter of the test information includes the strength of the test information and the quality of the test information, when the strength of the test information is greater than the preset value 1 and the quality of the test information is greater than the preset value 2, it may be considered that the distance between the primary electronic device and the secondary electronic device meets the preset condition. In another case, it may be considered that the distance between the primary electronic device and the secondary electronic device does not meet the preset condition.

When the distance between the primary electronic device and the secondary electronic device meets the preset condition, the secondary electronic device may output information used to indicate that a current network signal is good. In this case, the user may preferentially select the policy 1.

In an implementation, the secondary electronic device outputs the information used to indicate that the current network signal is good.

For example, the secondary electronic device may prompt, on a display interface of the secondary electronic device, that the current network signal is good.

For example, the secondary electronic device may prompt, by using speech information, that the current network signal is good.

In another possible implementation, the secondary electronic device sends, to the relay electronic device, the information used to indicate that the current network signal is good, so that the relay electronic device outputs the information used to indicate that the current network signal is good.

For example, the relay electronic device may prompt, on the display interface of the relay electronic device, that the current network signal is good.

For example, the relay electronic device may prompt, by using speech information, that the current network signal is good.

When the distance between the primary electronic device and the secondary electronic device does not meet the preset condition, the secondary electronic device may output information used to indicate that a current network signal is poor. In this case, the user may preferentially select the policy 2.

In an implementation, the secondary electronic device outputs the information used to indicate that the current network signal is poor.

For example, the secondary electronic device may prompt, on a display interface of the secondary electronic device, that the current network signal is poor.

For example, the secondary electronic device may prompt, by using speech information, that the current network signal is poor.

In another possible implementation, the secondary electronic device sends, to the relay electronic device, the information used to indicate that the current network signal is poor, so that the relay electronic device outputs the information used to indicate that the current network signal is poor.

For example, the relay electronic device may prompt, on the display interface of the relay electronic device, that the current network signal is poor.

For example, the relay electronic device may prompt, by using speech information, that the current network signal is poor.

When the user determines to use the policy 1, S815 to S820 are performed. When the user determines to use the policy 2, S821 to S831 are performed.

In an implementation, the user may input, by using the secondary electronic device, the data sharing policy to be used.

For example, the user may select, on the display interface of the secondary electronic device, the data sharing policy to be used.

For example, the user may select, by using a speech assistant on the secondary electronic device, the data sharing policy to be used.

In another possible implementation, the user may input, by using the relay electronic device, the data sharing policy to be used.

For example, the user may select, on the display interface of the relay electronic device, the data sharing policy to be used.

For example, the user may select, by using a speech assistant on the relay electronic device, the data sharing policy to be used.

For S815 to S820, refer to the foregoing descriptions. Details are not described herein again.

For S821 to S831, refer to the foregoing descriptions. Details are not described herein again.

When screen projection and/or sound projection need to be performed, to the secondary electronic device, for data being played on the primary electronic device, if the protocol type between the primary electronic device and the secondary electronic device is a homogeneous protocol and the distance between the primary electronic device and the secondary electronic device is short, the network connection information of the primary electronic device or the network connection information of the secondary electronic device is sent to the secondary electronic device or the primary electronic device by using the relay electronic device, to implement a network connection between the primary electronic device and the secondary electronic device. In addition, screen projection and/or sound projection are performed, to the secondary electronic device through the connected network, for the data being played on the primary electronic device, so that screen projection and/or sound projection between the primary electronic device and the secondary electronic device can be conveniently and quickly implemented. This implements collaboration between the primary electronic device and the secondary electronic device, and improves user experience.

When screen projection and/or sound projection need to be performed, to the secondary electronic device, for data being played on the primary electronic device, if the protocol type between the primary electronic device and the secondary electronic device is a homogeneous protocol and the distance between the primary electronic device and the secondary electronic device is long, the data being played on the primary electronic device may be first sent to the relay electronic device, and then the relay electronic device forwards the data being played on the primary electronic device to the secondary electronic device, so that screen projection and/or sound projection can be performed, to the secondary electronic device to continue to perform playing, for the data being played on the primary electronic device. In this way, screen projection and/or sound projection between the primary electronic device and the secondary electronic device can be conveniently and quickly implemented. This implements collaboration between the primary electronic device and the secondary electronic device, and improves user experience.

Manner 2: The relay electronic device may first determine whether a distance between the primary electronic device and the secondary electronic device meets a condition, and then determine a protocol type between the primary electronic device and the secondary electronic device based on a determining result, and then determine a data sharing policy between the primary electronic device and the secondary electronic device.

A difference between Manner 2 and Manner 1 lies in that, in Manner 2, the distance between the primary electronic device and the secondary electronic device is determined first, and then protocol type between the primary electronic device and the secondary electronic device is determined, and finally, the data sharing policy between the primary electronic device and the secondary electronic device is determined. A specific implementation process of each step is the same in Manner 2 and Manner 1. Therefore, details are not described herein again. Refer to the descriptions in Manner 1.

Optionally, in this embodiment of this application, there may be one or more primary electronic devices. When there are a plurality of primary electronic devices, each primary electronic device may perform the steps performed by the primary electronic device in the method 700 or the method 800.

Optionally, in this embodiment of this application, there may be one or more secondary electronic devices. When there are a plurality of secondary electronic devices, each secondary electronic device may perform the steps performed by the secondary electronic device in the method 700 or the method 800.

It may be understood that, to implement the foregoing functions, the electronic device includes corresponding hardware and/or software modules for performing the functions. With reference to example algorithm steps described in embodiments disclosed in this specification, embodiments of this application can be implemented in a form of hardware or a combination of hardware and computer software. Whether a function is performed by hardware or hardware driven by computer software depends on a particular application and a design constraint of technical solutions. A person skilled in the art may use different methods to implement the described functions for each particular application with reference to embodiments, but it should not be considered that the implementation goes beyond the scope of embodiments of this application.

In embodiments, the electronic device may be divided into functional modules based on the foregoing method examples. For example, each functional module corresponding to each function may be obtained through division, or two or more functions may be integrated into one processing module. The integrated module may be implemented in a form of hardware. It should be noted that, in embodiments, division into the modules is an example, and is merely logical function division. During actual implementation, another division manner may be used.

An embodiment further provides a computer-readable storage medium. The computer-readable storage medium stores computer instructions. When the computer instructions are run on an electronic device, the electronic device is enabled to perform the foregoing related method steps, to implement the data sharing method in the foregoing embodiments.

An embodiment further provides a computer program product. When the computer program product runs on a computer, the computer is enabled to perform the foregoing related steps, to implement the data sharing method in the foregoing embodiments.

In addition, an embodiment of this application further provides an apparatus. The apparatus may be specifically a chip, a component, or a module. The apparatus may include a processor and a memory that are connected to each other. The memory is configured to store computer-executable instructions. When the apparatus runs, the processor may execute the computer-executable instructions stored in the memory, so that the chip performs the data sharing method in the foregoing method embodiments.

The electronic device, the computer storage medium, the computer program product, or the chip provided in embodiments is configured to perform the corresponding method provided above. Therefore, for beneficial effects that can be achieved, refer to the beneficial effects of the corresponding method provided above. Details are not described herein again.

Based on the foregoing descriptions of the implementations, a person skilled in the art may understand that, for the purpose of convenient and brief description, division into the foregoing functional modules is merely used as an example for illustration. During actual application, the foregoing functions may be allocated to different functional modules for implementation according to a requirement. To be specific, an inner structure of the apparatus is divided into different functional modules to implement all or some of the functions described above.

In several embodiments provided in embodiments of this application, it should be understood that the disclosed apparatus and method may be implemented in other manners. For example, the described apparatus embodiments are merely examples. For example, the division into the modules or units is merely logical function division and may be other division during actual implementation. For example, a plurality of units or components may be combined or integrated into another apparatus, or some features may be ignored or not performed. In addition, the shown or discussed mutual couplings or direct couplings or communication connections may be implemented through some interfaces. The indirect couplings or communication connections between the apparatuses or units may be implemented in electrical, mechanical, or another form.

The units described as separate parts may or may not be physically separate, and parts shown as units may be one or more physical units, may be located in one place, or may be distributed in different places. Some or all of the units may be selected according to actual requirements to achieve objectives of solutions of embodiments.

In addition, functional units in embodiments of this application may be integrated into one processing unit, or each of the units may exist alone physically, or two or more units may be integrated into one unit. The integrated unit may be implemented in a form of hardware, or may be implemented in a form of a software functional unit.

When the integrated unit is implemented in the form of the software functional unit and sold or used as an independent product, the integrated unit may be stored in a readable storage medium. Based on such an understanding, technical solutions of embodiments of this application essentially, or the part contributing to the conventional technology, or all or some of the technical solutions may be implemented in a form of a software product. The software product is stored in a storage medium and includes several instructions for instructing a device (which may be a single-chip microcomputer, a chip, or the like) or a processor (processor) to perform all or some of the steps of the methods described in all of embodiments of this application. The storage medium includes any medium that can store program code, for example, a USB flash drive, a removable hard disk, a read-only memory (read-only memory, ROM), a random access memory (random access memory, RAM), a magnetic disk, or an optical disc.

The foregoing descriptions are merely specific implementations of embodiments of this application, but are not intended to limit the protection scope of embodiments of this application. Any variation or replacement readily figured out by a person skilled in the art within the technical scope disclosed in embodiments of this application shall fall within the protection scope of embodiments of this application. Therefore, the protection scope of embodiments of this application should be subject to the protection scope of the claims.

What is claimed is:

1. A method comprising:
   establishing, by a relay electronic device, a first near field wireless connection between the relay electronic device and a primary electronic device;
   receiving, by the relay electronic device, a first message sent by the primary electronic device, wherein the first message comprises network connection information of the primary electronic device;
   establishing, by the relay electronic device, a second near field wireless connection between the relay electronic device and a secondary electronic device;
   receiving, by the relay electronic device, a second message sent by the secondary electronic device, wherein the second message comprises network connection information of the secondary electronic device;
   determining, by the relay electronic device based on the first message and the second message, a policy for projecting media data of the primary electronic device to the secondary electronic device, wherein the policy comprises a first policy or a second policy, the first policy is that the primary electronic device directly projects the media data of the primary electronic device to the secondary electronic device, and the second policy is that the primary electronic device projects the media data of the primary electronic device to the secondary electronic device by using the relay electronic device; and
   projecting or assisting projecting, by the relay electronic device, the media data of the primary electronic device to the secondary electronic device according to the policy.

2. The method according to claim 1, wherein determining, by the relay electronic device based on the first message and the second message, the policy for projecting the media data of the primary electronic device to the secondary electronic device comprises:
   determining, by the relay electronic device based on the first message and the second message, whether network connection modes of the primary electronic device and the secondary electronic device are the same; and
   when the network connection modes of the primary electronic device and the secondary electronic device are different, determining, by the relay electronic device, that the policy for projecting the media data of the primary electronic device to the secondary electronic device is the second policy; or
   when the network connection modes of the primary electronic device and the secondary electronic device are the same, determining, by the relay electronic device, that the policy for projecting the media data of the primary electronic device to the secondary electronic device is the first policy.

3. The method according to claim 1, wherein determining, by the relay electronic device based on the first message and the second message, the policy for projecting the media data of the primary electronic device to the secondary electronic device comprises:
   determining, by the relay electronic device based on the first message and the second message, whether network connection modes of the primary electronic device and the secondary electronic device are the same; and
   when the network connection modes of the primary electronic device and the secondary electronic device are different, determining, by the relay electronic device, that the policy for projecting the media data of the primary electronic device to the secondary electronic device is the second policy; or
   when the network connection modes of the primary electronic device and the secondary electronic device are the same,
      determining, by the relay electronic device, whether a distance between the primary electronic device and the secondary electronic device meets a preset condition, wherein the preset condition is that the distance between the primary electronic device and the secondary electronic device is less than or equal to a preset distance; and
      when the distance between the primary electronic device and the secondary electronic device does not meet the preset condition, determining, by the relay electronic device, that the policy for projecting the media data of the primary electronic device to the secondary electronic device is the second policy; or
      when the distance between the primary electronic device and the secondary electronic device meets the preset condition, determining, by the relay electronic device, that the policy for projecting the media data of the primary electronic device to the secondary electronic device is the first policy.

4. The method according to claim 3, wherein before determining, by the relay electronic device, whether the distance between the primary electronic device and the secondary electronic device meets the preset condition, the method further comprises:
   receiving, by the relay electronic device, prompt information sent by the secondary electronic device, wherein the prompt information indicates whether the distance between the primary electronic device and the secondary electronic device meets the preset condition.

5. The method according to claim 1, wherein when the policy for projecting the media data of the primary electronic device to the secondary electronic device is the second policy, projecting or assisting projecting, by the relay electronic device, the media data of the primary electronic device to the secondary electronic device according to the policy comprises:
   establishing, by the relay electronic device, a third near field network connection between the relay electronic device and the primary electronic device;

receiving, by the relay electronic device through the established third near field network connection, the media data of the primary electronic device that is sent by the primary electronic device;

establishing, by the relay electronic device, a fourth near field network connection between the relay electronic device and the secondary electronic device; and sending, by the relay electronic device, the media data of the primary electronic device to the secondary electronic device through the established fourth near field network connection.

6. The method according to claim 1, wherein when the policy for projecting the media data of the primary electronic device to the secondary electronic device is the first policy, projecting or assisting projecting, by the relay electronic device, the media data of the primary electronic device to the secondary electronic device according to the policy comprises:

sending, by the relay electronic device, a third message to the primary electronic device, wherein the third message comprises the network connection information of the secondary electronic device, and the third message indicates the primary electronic device to establish a network connection to the secondary electronic device, so that the primary electronic device transmits the media data of the primary electronic device to the secondary electronic device through the network connection; or sending, by the relay electronic device, a fourth message to the secondary electronic device, wherein the fourth message comprises the network connection information of the primary electronic device, and the fourth message indicates the secondary electronic device to establish a network connection to the primary electronic device, so that the secondary electronic device receives, through the network connection, the media data of the primary electronic device that is transmitted by the primary electronic device.

7. The method according to claim 1, wherein the media data comprises at least one of following: video data, audio data, document data, or picture data.

8. A method comprising:

establishing, by a relay electronic device, a near field wireless connection between the relay electronic device and a primary electronic device;

receiving, by the relay electronic device, a first media file sent by the primary electronic device;

displaying, by the relay electronic device, a first window on a display interface of the relay electronic device, wherein the first window comprises an identifier of the first media file;

storing, by the relay electronic device, the first media file on the relay electronic device when the relay electronic device detects an operation of selecting the first media file by a user in the first window;

establishing, by the relay electronic device, a near field wireless connection between the relay electronic device and a secondary electronic device;

displaying a second window on the display interface of the relay electronic device, wherein the second window comprises the identifier of the first media file; and sending, by the relay electronic device, the first media file to the secondary electronic device when the relay electronic device detects an operation of selecting the first media file by the user in the second window.

9. The method according to claim 8, wherein the first window further comprises a copy control operable by the user for performing local file storage, and storing, by the relay electronic device, the first media file on the relay electronic device when the relay electronic device detects the operation of selecting the first media file by the user in the first window comprises:

storing, by the relay electronic device, the first media file on the relay electronic device when the relay electronic device detects an operation of the user on the identifier of the first media file displayed in the first window and an operation of the user on the copy control displayed in the first window.

10. The method according to claim 8, wherein the second window further comprises a paste control operable by the user for performing file sending to another electronic device, and sending, by the relay electronic device, the first media file to the secondary electronic device when the relay electronic device detects the operation of selecting the first media file by the user in the second window comprises:

sending, by the relay electronic device, the first media file to the secondary electronic device when the relay electronic device detects an operation of the user on the identifier of the first media file displayed in the second window and an operation of the user on the paste control in the second window.

11. The method according to claim 8, wherein the first window further comprises a name of the primary electronic device.

12. The method according to claim 8, wherein the second window further comprises a name of the primary electronic device.

13. The method according to claim 8, wherein the first media file comprises at least one of following: a video file, a document file, an audio file, or a picture file.

14. An electronic device, comprising:

one or more processors;

a non-transitory memory comprising one or more programs;

wherein when the one or more programs are executed by the one or more processors, the electronic device as a relay electronic device is caused to perform:

establishing a first near field wireless connection to a primary electronic device;

receiving a first message sent by the primary electronic device, wherein the first message comprises network connection information of the primary electronic device;

establishing a second near field wireless connection to a secondary electronic device;

receiving a second message sent by the secondary electronic device, wherein the second message comprises network connection information of the secondary electronic device;

determining, based on the first message and the second message, a policy for projecting media data of the primary electronic device to the secondary electronic device, wherein the policy comprises a first policy or a second policy, the first policy is that the primary electronic device directly projects the media data of the primary electronic device to the secondary electronic device, and the second policy is that the primary electronic device projects the media data of the primary electronic device to the secondary electronic device by using the relay electronic device; and projecting or assisting projecting the media data of the primary electronic device to the secondary electronic device according to the policy.

15. The electronic device according to claim 14, wherein determining, based on the first message and the second message, the policy for projecting the media data of the primary electronic device to the secondary electronic device comprises:
  determining, based on the first message and the second message, whether network connection modes of the primary electronic device and the secondary electronic device are the same; and
  determining that the policy for projecting the media data of the primary electronic device to the secondary electronic device is the second policy when the network connection modes of the primary electronic device and the secondary electronic device are different; or
  determining that the policy for projecting the media data of the primary electronic device to the secondary electronic device is the first policy when the network connection modes of the primary electronic device and the secondary electronic device are the same.

16. The electronic device according to claim 14, wherein determining, based on the first message and the second message, the policy for projecting the media data of the primary electronic device to the secondary electronic device comprises:
  determining, based on the first message and the second message, whether network connection modes of the primary electronic device and the secondary electronic device are the same; and
  determining that the policy for projecting the media data of the primary electronic device to the secondary electronic device is the second policy when the network connection modes of the primary electronic device and the secondary electronic device are different; or
  when the network connection modes of the primary electronic device and the secondary electronic device are the same,
    determining whether a distance between the primary electronic device and the secondary electronic device meets a preset condition, wherein the preset condition is that the distance between the primary electronic device and the secondary electronic device is less than or equal to a preset distance; and
    determining that the policy for projecting the media data of the primary electronic device to the secondary electronic device is the second policy when the distance between the primary electronic device and the secondary electronic device does not meet the preset condition; or
    determining that the policy for projecting the media data of the primary electronic device to the secondary electronic device is the first policy when the distance between the primary electronic device and the secondary electronic device meets the preset condition.

17. The electronic device according to claim 16, wherein before determining whether the distance between the primary electronic device and the secondary electronic device meets the preset condition, the electronic device as the relay electronic device is further caused to perform:
  receiving prompt information sent by the secondary electronic device, wherein the prompt information indicates whether the distance between the primary electronic device and the secondary electronic device meets the preset condition.

18. The electronic device according to claim 14, wherein when the policy for projecting the media data of the primary electronic device to the secondary electronic device is the second policy, projecting the media data of the primary electronic device to the secondary electronic device according to the policy comprises:
  establishing a third near field network connection between the relay electronic device and the primary electronic device;
  receiving, through the established third near field network connection, the media data of the primary electronic device that is sent by the primary electronic device;
  establishing a fourth near field network connection between the relay electronic device and the secondary electronic device; and
  sending the media data of the primary electronic device to the secondary electronic device through the established fourth near field network connection.

19. The electronic device according to claim 14, wherein when the policy for projecting the media data of the primary electronic device to the secondary electronic device is the first policy, projecting or assisting projecting the media data of the primary electronic device to the secondary electronic device according to the policy comprises:
  sending a third message to the primary electronic device, wherein the third message comprises the network connection information of the secondary electronic device, and the third message indicates the primary electronic device to establish a network connection to the secondary electronic device, so that the primary electronic device transmits the media data of the primary electronic device to the secondary electronic device through the network connection; or
  sending a fourth message to the secondary electronic device, wherein the fourth message comprises the network connection information of the primary electronic device, and the fourth message indicates the secondary electronic device to establish a network connection to the primary electronic device, so that the secondary electronic device receives, through the network connection, the media data of the primary electronic device that is transmitted by the primary electronic device.

20. The electronic device according to claim 14, wherein the media data comprises at least one of following: video data, audio data, document data, or picture data.

* * * * *